US012500011B2

(12) United States Patent
Banno

(10) Patent No.: US 12,500,011 B2
(45) Date of Patent: Dec. 16, 2025

(54) SUPERCONDUCTING CONNECTION STRUCTURE OF NB3SN SUPERCONDUCTING WIRE ROD AND NBTI WIRE ROD, METHOD FOR PRODUCING SAME, AND NUCLEAR MAGNETIC RESONANCE APPARATUS USING SAME

(71) Applicant: NATIONAL INSTITUTE FOR MATERIALS SCIENCE, Tsukuba (JP)

(72) Inventor: Nobuya Banno, Tsukuba (JP)

(73) Assignee: National Institute for Materials Science, Ibaraki (JP)

( * ) Notice: Subject to any disclaimer, the term of this patent is extended or adjusted under 35 U.S.C. 154(b) by 142 days.

(21) Appl. No.: 18/562,234

(22) PCT Filed: May 11, 2022

(86) PCT No.: PCT/JP2022/019931
§ 371 (c)(1),
(2) Date: Nov. 17, 2023

(87) PCT Pub. No.: WO2022/259803
PCT Pub. Date: Dec. 15, 2022

(65) Prior Publication Data
US 2024/0242857 A1    Jul. 18, 2024

(30) Foreign Application Priority Data

Jun. 8, 2021 (JP) .................... 2021-095620

(51) Int. Cl.
*H01B 12/00* (2006.01)
*H01B 12/02* (2006.01)
(52) U.S. Cl.
CPC .................... *H01B 12/02* (2013.01)
(58) Field of Classification Search
CPC .................................................. H01B 12/02
See application file for complete search history.

(56) References Cited

U.S. PATENT DOCUMENTS 3,422,529 A     1/1969  Nuding
3,699,647 A *  10/1972  Bidault ............... H01B 12/10
                                                         228/5.1

(Continued)

FOREIGN PATENT DOCUMENTS

EP          0459156 A2   12/1991
WO    2018/198515 A1   11/2018
WO    2021/024529 A1    2/2021

OTHER PUBLICATIONS

Banno et al., "High-temperature-tolerable superconducting Nb-alloy and its application to Pb- and Cd-free superconducting joints between NbTi and Nb3Sn wires," Journal of Materials Science, 56: 20197-20207 (2021).

(Continued)

*Primary Examiner* — Pete T Lee
(74) *Attorney, Agent, or Firm* — Morgan, Lewis & Bockius LLP

(57) ABSTRACT

A superconducting connection structure is provided with: a connection strip that comprises an Nb alloy strip to which an element M is added (wherein the element M is an element which increases the recovery temperature and the recrystallization temperature of Nb); an $Nb_3Sn$ superconducting wire rod that comprises an $Nb_3Sn$ superconducting core material; and an NbTi wire rod that comprises an NbTi core material. With respect to this superconducting connection structure, one end of the connection strip is connected to the $Nb_3Sn$ superconducting wire rod by having the Nb alloy strip and the Nb3Sn superconducting core material in contact with each other by the intermediary of an Nb3Sn superconducting layer; and the other end of the connection strip is connected to the NbTi wire rod by having a newly formed surface of the Nb alloy strip and a newly formed surface of the NbTi core material in contact with each other.

22 Claims, 14 Drawing Sheets

(56) References Cited

U.S. PATENT DOCUMENTS

| | | | |
|---|---|---|---|
| 4,907,338 A | 3/1990 | Thornton | |
| 2018/0012682 A1* | 1/2018 | Ichiki | H10N 60/80 |
| 2020/0020463 A1 | 1/2020 | Banno et al. | |
| 2021/0225561 A1* | 7/2021 | Rey | H01B 12/02 |

OTHER PUBLICATIONS

Williams et al., "600 MHZ Spectrometer Magnet," IEEE Transactions on Magnetics, 25 (2): 1767-1770 (1989).

Brittles et al., "Persistent current joints between technological superconductors," Superconductor Science and Technology, 28: 093001 (2015).

Ferreira et al., "Effects of recovery and recrystallization on microstructure and texture during annealing of a cold deformed superconducting Nb-50(wt.)%Ti alloy," Journal of Alloys and Compounds, 887: 161334 (2021).

Extended European Search Report issued in European Patent Application No. 22819987.3 dated May 6, 2025.

International Search Report (with partial translation) idated Jul. 19, 2022, issued in corresponding International Patent Application No. PCT/JP2022/019931.

Brittles et al., "Persistent current joints between technological superconductors", supercond. Sci. Technol. 28 (2015) 093001.

Banno et al., "Influence of parent Nb-alloy grain morphology on the layer formation of Nb3Sn and its flux pinning characteristics", Scripta Materialia 199 (2021) 113822.

* cited by examiner

FIG.5
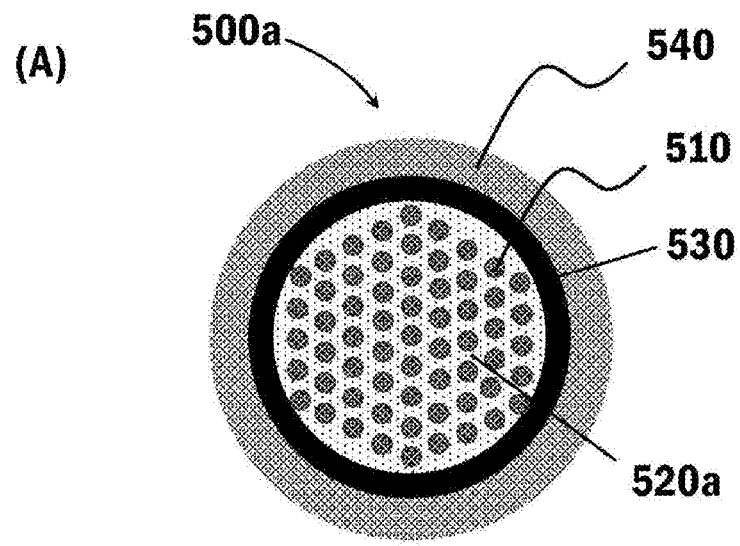
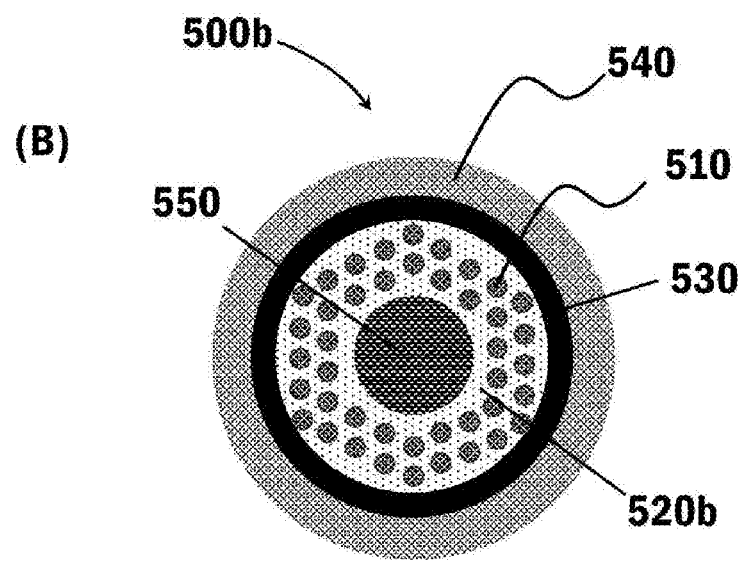

SUPERCONDUCTING CONNECTION STRUCTURE OF NB3SN SUPERCONDUCTING WIRE ROD AND NBTI WIRE ROD, METHOD FOR PRODUCING SAME, AND NUCLEAR MAGNETIC RESONANCE APPARATUS USING SAME

TECHNICAL FIELD

The present invention relates to a superconducting joint structural body in which a $Nb_3Sn$ superconducting wire and a NbTi wire are jointed, a method for manufacturing the same, and an NMR analyzer that uses the same.

BACKGROUND ART

It is preferable that a magnet for orienting nuclear spin in a nuclear magnetic resonance (NMR) apparatus is driven in a persistent current mode for a precise NMR measurement. For this purpose, in addition to the use of a superconducting wire having zero electric resistance, a technique of realizing a joint between superconducting wires having a limited length at zero resistance, which is so-called superconducting joint technique, has been desired.

In particular, in a medium-sized NMR apparatus that needs to generate a magnetic field of 10 T (Tesla) or more, superconducting joint is essential not only between NbTi superconducting wires, but also between different superconducting materials of a NbTi superconducting wire and a $Nb_3Sn$ superconducting wire used for high magnetic field application.

As for NbTi, it has known that the NbTi is an alloy prepared by solid-solving Ti into a body-centered cubic lattice of Nb, and thus has ductility and toughness, and that the superconducting joint thereof can be achieved also by means of mechanical pressure welding (see "Patent Literature 1", for example). In contrast, $Nb_3Sn$ is an A15-type compound crystal composed of Nb atoms and Sn atoms in a ratio of 3:1, has no ductility, and is hard and brittle. Therefore, the joint by means of a mechanical method has been impossible.

In view of such circumstances, as a substitute means for the joint by means of a mechanical method, a superconducting joint technique of utilizing a low-melting-point superconducting solder has been developed (see "Patent Literature 2" and "Non-Patent Literature 1", for example). In "Patent Literature 2", the following method is disclosed. At the ends of NbTi and $Nb_3Sn$ multi-core wires, a Cu matrix embedding superconducting filaments is melted in molten Sn or molten Sn alloy, thereby directly coating the filaments with Sn. Next, the ends of both the wires are immersed in molten Pb—Bi to replace Sn with Pb—Bi. Finally, the ends of both the wires are immersed in a cup filled with Pb—Bi to form a joint portion, thereby realizing a superconducting joint between the NbTi wire and $Nb_3Sn$ wire. According to this method, the NbTi and the $Nb_3Sn$ filaments that are easily oxidized can be in close contact with the superconductive Pb—Bi without exposing their surfaces to the air as well as without applying thereto mechanical deformation, thereby realizing a good superconducting joint between the NbTi wire and $Nb_3Sn$ wire through the Pb—Bi superconducting joint. This joint has the superconducting properties that depend on the properties of Pb—Bi, and is ordinarily used in a magnetic environment of 0.5 to 1.0 T.

In "Non-Patent Literature 1", a superconducting joint technique of using other low-melting-point superconducting solders such as Wood's metal (50% Bi-24% Pb-14% Sn-12% Cd), Pb—In, and Sn—In is disclosed. Many of them that are highly practical as well as that have relatively high critical magnetic field contain Pb and Cd of environmentally hazardous substances.

However, Pb and Cd have come to be more strictly regulated as environmentally hazardous substances. Thus, an environment-friendly novel joint technology without using these substances have been strongly desired.

On the other hand, a recent study on $Nb_3Sn$ tissue control has reported that Hf increases recovery and recrystallization temperatures of Nb (see "Non-Patent Literature 2", for example). According to FIG. 1 of "Non-Patent Literature 2", it is reported that Nb-4 at % Ta-Tat % Hf alloy prepared by adding 1 at % of Hf and 4 at % of Ta to Nb maintains densification thereof even after performing an annealing treatment at 900° C. According to FIG. 2 of "Non-Patent Literature 2", it is reported that as a result of a study on the recovery and recrystallization temperatures of a Nb—Hf alloy prepared by adding only Hf to Nb, the recovery temperature was found to greatly exceed 600° C.

CITATION LIST

Patent Literature

PATENT LITERATURE 1: U.S. Pat. No. 3,422,529 A
PATENT LITERATURE 2: U.S. Pat. No. 4,907,338 A

Non-Patent Literature

NON-PATENT LITERATURE 1: G. D. Brittles, et al., Supercond. Sci. Technol., 28, 2015, 093001
NON-PATENT LITERATURE 2: N. Banno, et al., Scripta Materialia, 199, 2021, 113822

SUMMARY OF INVENTION

Technical Problem

As described above, in the superconducting joint technique of utilizing a low-melting-point superconducting solder, the conventional superconducting joint technique for jointing the $Nb_3Sn$ superconducting wire and the NbTi wire (e.g., "Patent Literature 2" and "Non-Patent Literature 1") uses environmentally hazardous substances such as Pb and Cd.

Also, "Non-Patent Literature 2" relates to only the tissue control study of $Nb_3Sn$ itself, and gives neither teaching nor suggestion on a superconducting joint between different superconducting materials (e.g., a superconducting joint between the $Nb_3Sn$ superconducting wire and the NbTi wire).

In view of such circumstances, it is an object of the present invention to provide a superconducting joint structural body that has a superconducting joint between a $Nb_3Sn$ superconducting wire and a NbTi wire, wherein the superconducting joint structural body is an entirely novel beyond the conventional ideas and does not contain any environmentally hazardous substances such as Pb and Cd; a method for manufacturing the same; and a nuclear magnetic resonance apparatus that uses the same.

Solution to Problem

The superconducting joint structural body of the present invention comprises: a joint strip having one or more of Nb alloy strips to which an element M is added (wherein the element M is an element that increases a recovery temperature and a recrystallization temperature of Nb); a $Nb_3Sn$ superconducting wire having one or more of $Nb_3Sn$ superconducting cores; and a NbTi wire having one or more of NbTi cores, wherein one end of the joint strip is jointed with the $Nb_3Sn$ superconducting wire by contact with each of the one or more of Nb alloy strips and each of the one or more of $Nb_3Sn$ superconducting cores through a $Nb_3Sn$ superconducting layer, and the other end of the joint strip is jointed with the NbTi wire by mutual contact with each bare surface of the one or more of Nb alloy strips and each bare surface of the one or more of NbTi cores, thereby solving the above problems.

The above element M may be at least one selected from the group consisting of hafnium (Hf), titanium (Ti), tantalum (Ta), zirconium (Zr), and tungsten (W).

The above Nb alloy strip may have any one shape selected from the group consisting of a core, a sheet, and a pipe.

Also, the above strip in the present application means a band-like long and thin one formed in the shape of a core, a sheet, a pipe or the like.

The above element M may be added in a range from 0.2 at % or more to 10 at % or less (wherein the unit "at %" means atomic percentage of the above element M contained in the one or more of Nb alloy strips).

Each of a portion where each of the one or more of Nb alloy strips and each of the one or more of $Nb_3Sn$ superconducting cores are in contact with each other through a $Nb_3Sn$ superconducting layer and a portion where each bare surface of the one or more of Nb alloy strips and each bare surface of the one or more of NbTi cores are in mutual contact may be covered by means of a crimp tube made of at least one material selected from the group consisting of tantalum (Ta), niobium (Nb), copper-nickel alloy (CuNi), and stainless steel.

Each of the above covered portions may have a length in a range from 10 mm or more to 30 mm or less.

The above joint strip may have the following structures: each of the one or more of Nb alloy strips is covered with and/or embedded in a first stabilizer; the $Nb_3Sn$ superconducting wire has the one or more of $Nb_3Sn$ superconducting cores each of which is covered with and/or embedded in a second stabilizer; the NbTi wire has the one or more of NbTi cores each of which is covered with and/or embedded in a third stabilizer; and each of the first to third stabilizers is at least one metal selected from the group consisting of copper metal, copper alloy, silver metal, and silver alloy.

A method for manufacturing the above superconducting joint structural body of the present invention comprises the steps of: a first jointing step for jointing one end of a joint strip having one or more of Nb alloy strips to which an element M is added (wherein the element M is an element that increases a recovery temperature and a recrystallization temperature of Nb) and a $Nb_3Sn$ superconducting wire having one or more of $Nb_3Sn$ superconducting cores; and a second jointing step for jointing the other end of the joint strip and a NbTi wire having one or more of NbTi cores, the first jointing step comprising the steps of: a step of exposing the one or more of Nb alloy strips from one end of the joint strip; a step of exposing the one or more of Nb cores from one end of a $Nb_3Sn$ superconducting precursor wire having one or more of Nb cores that are embedded in a matrix that contains at least Cu and Sn; a step of bundling the exposed one or more of Nb alloy strips and the exposed one or more of Nb cores together; a step of crimping the one or more of Nb alloy strips and the one or more of Nb cores that are bundled together; and a step of annealing the joint strip having the one or more of Nb alloy strips and the one or more of Nb cores that are crimped together and the $Nb_3Sn$ superconducting precursor wire, and the second jointing step comprising the steps of: a step of exposing the one or more of Nb alloy strips from the other end of the joint strip; a step of exposing the one or more of NbTi cores from one end of the NbTi wire; a step of bundling the exposed one or more of Nb alloy strips and the exposed one or more of NbTi cores together; and a step of crimping the one or more of Nb alloy strips and the one or more of NbTi cores that are bundled together, thereby solving the above problems.

The above step of exposing the one or more of Nb alloy strips in the first jointing step and the above step of exposing the one or more of Nb alloy strips in the second jointing step may be performed by means of chemical corrosion.

The above step of exposing the one or more of Nb cores in the first jointing step may be performed by means of chemical corrosion.

The above step of exposing the one or more of Nb cores in the first jointing step may be further performed by means of mechanical polishing.

The above step of exposing the one or more of NbTi cores in the second jointing step may be performed by means of chemical corrosion.

Each of the following steps: the step of exposing the one or more of Nb alloy strips in the first jointing step and the step of exposing the one or more of Nb alloy strips in the second jointing step; the step of exposing the one or more of Nb cores in the first jointing step; and the step of exposing the one or more of NbTi cores in the second jointing step may be performed so that any exposed length is in a range from 10 mm or more and 30 mm or less.

The above crimping step in the first jointing step may be performed by exposing each bare surface of the one or more of Nb alloy strips and each bare surface of the one or more of Nb cores, and by being the each bare surface of the one or more of Nb alloy strips and the each bare surface of the one or more of Nb cores in close contact with each other.

The above crimping step in the first jointing step may be performed by covering a portion bundling the one or more of Nb alloy strips and the one or more of Nb cores by means of a crimp tube made of at least one material selected from the group consisting of tantalum (Ta), niobium (Nb), copper-nickel alloy (CuNi), and stainless steel, and applying a pressure in a perpendicular direction to a longitudinal direction of the one or more of Nb alloy strips and the one or more of Nb cores that are bundled together.

The above pressure may be in a range from 100 MPa or more to 1 GPa or less.

The above annealing step in the first jointing step may be performed by means of an annealing treatment of the joint strip and the $Nb_3Sn$ superconducting precursor wire, in vacuum or in an inert gas atmosphere, within a temperature range from 600° C. or more to 800° C. or less.

The above annealing step in the first jointing step may be performed by means of an annealing treatment of the joint strip and the $Nb_3Sn$ superconducting precursor wire, in vacuum or in an inert gas atmosphere, within a temperature range from 300° C. or more to 500° C. or less for 50 hours or more to 150 hours or less, and then within a temperature range from 600° C. or more to 800° C. or less for 50 hours or more to 150 hours or less.

The above crimping step in the second jointing step may be performed by exposing each bare surface of the one or more of Nb alloy strips and the one or more of NbTi cores, and by being the each bare surface of the one or more of Nb alloy strips and the each bare surface of the one or more of NbTi cores in close contact with each other.

The above crimping step in the second jointing step may be performed by covering a portion bundling the one or more of Nb alloy strips and the one or more of NbTi cores by means of a crimp tube made of a material selected from the group consisting of tantalum (Ta), niobium (Nb), copper-nickel alloy (CuNi), and stainless steel, and applying a pressure in a perpendicular direction to a longitudinal direction of the one or more of Nb alloy strips and the one or more of NbTi cores that are bundled together.

The above pressure may be in a range from 100 MPa or more and 1 GPa or less.

Herein, the bare surface in this application means an activated metal surface that does not have oxide film or the like as well as that is not exposed to the air.

A nuclear magnetic resonance apparatus of the present invention uses the above superconducting joint structural body (that is, a nuclear magnetic resonance apparatus of the present invention comprising the above superconducting joint structural body), thereby solving the above problems.

Advantageous Effects of Invention

The superconducting joint structural body of the present invention joints the $Nb_3Sn$ superconducting wire and the NbTi wire by the use of the one or more of Nb alloy strips to which the element M is added. By adding the element M to each of the one or more of Nb alloy strips, the recovery and recrystallization temperatures of Nb increase, so that the superconducting properties of the one or more of Nb alloy strips do not decrease even after performing an annealing treatment at high temperatures (specifically, an annealing treatment for forming $Nb_3Sn$ layer). As a result, the one or more of Nb alloy strips can be jointed with the $Nb_3Sn$ superconducting wire at one end of the one or more of Nb alloy strips by diffusion jointing through the newly formed $Nb_3Sn$ superconducting layer. Furthermore, the one or more of Nb alloy strips can be mechanically jointed with the NbTi wire at the other end of the one or more of Nb alloy strips, so that the one or more of Nb alloy strips can be jointed with NbTi wire without decreasing the properties of the NbTi wire. As a result, a superconducting joint structural body in which the $Nb_3Sn$ superconducting wire and the NbTi wire are jointed without using any environmentally hazardous substances such as Pb and Cd as well as with maintaining the superconducting properties at a high level.

The above method for manufacturing the superconducting joint structural body of the present invention includes: the first jointing step for jointing one end of the joint strip having the one or more of Nb alloy strips to which the element M is added and the $Nb_3Sn$ superconducting wire having the one or more of $Nb_3Sn$ superconducting cores; and the second step for jointing the other end of the joint strip and the NbTi wire having the one or more of NbTi cores. Since the one or more of Nb alloy strips to which the element M making the recovery and recrystallization temperatures of Nb increase is added are used, the $Nb_3Sn$ superconducting wire can be manufactured from the $Nb_3Sn$ superconducting precursor wire without decreasing the properties of the Nb alloy strip even after performing an annealing treatment. And, the one or more of Nb alloy strips and the $Nb_3Sn$ superconducting wire can be jointed though the $Nb_3Sn$ superconducting layer formed on each of the one or more of Nb alloy strips. Followed by it, it is only necessary to mechanically joint the one or more of Nb alloy strips and the NbTi wire, and thus the superconducting joint between the $Nb_3Sn$ superconducting wire and the NbTi wire can be achieved without using any environmentally hazardous substances such as Pb and Cd.

BRIEF DESCRIPTION OF DRAWINGS

FIG. 2(A) illustrates the case where each strip shape of the one or more of Nb alloy strips is a core 110a, FIG. 2(B) illustrates the case where each strip shape of the one or more of Nb alloy strips is a sheet, and FIG. 2(C) illustrates the case where each strip shape of the one or more of Nb alloy strips is a pipe.

FIG. 5 contains schematic drawings illustrating an exemplary $Nb_3Sn$ superconducting precursor wire used for manufacturing the superconducting joint structural body of the present invention. Herein, FIG. 5(A) schematically illustrates an exemplary $Nb_3Sn$ superconducting precursor wire having one or more of Nb cores, a Cu—Sn matrix (that is, a matrix made of an alloy of Cu and Sn), a diffusion barrier layer, and a stabilizer, wherein the one or more of Nb cores are embedded in the Cu—Sn matrix. Also, FIG. 5 (B) schematically illustrates an exemplary $Nb_3Sn$ superconducting precursor wire having the one or more of Nb cores, a Cu matrix, a Sn matrix, a diffusion barrier layer, and a stabilizer, wherein the one or more of Nb cores are embedded only in the Cu matrix.

FIG. 12(A) is an electron microphotograph of the cross section of a joint portion between the joint strip (that is, the Nb—Ta—Hf wire) and the $Nb_3Sn$ superconducting core, FIG. 12(B) is a drawing illustrating Nb mapping of the joint portion, FIG. 12(C) is a drawing illustrating a reflected electron image of the joint portion, and FIG. 12(D) is a drawing illustrating Sn mapping of the joint portion.

DESCRIPTION OF EMBODIMENTS

Hereinafter, embodiments of the present invention will be explained with reference to the drawings. It is noted that all similar elements are denoted by similar reference signs, so as to properly skip the explanation.

Figure 1:
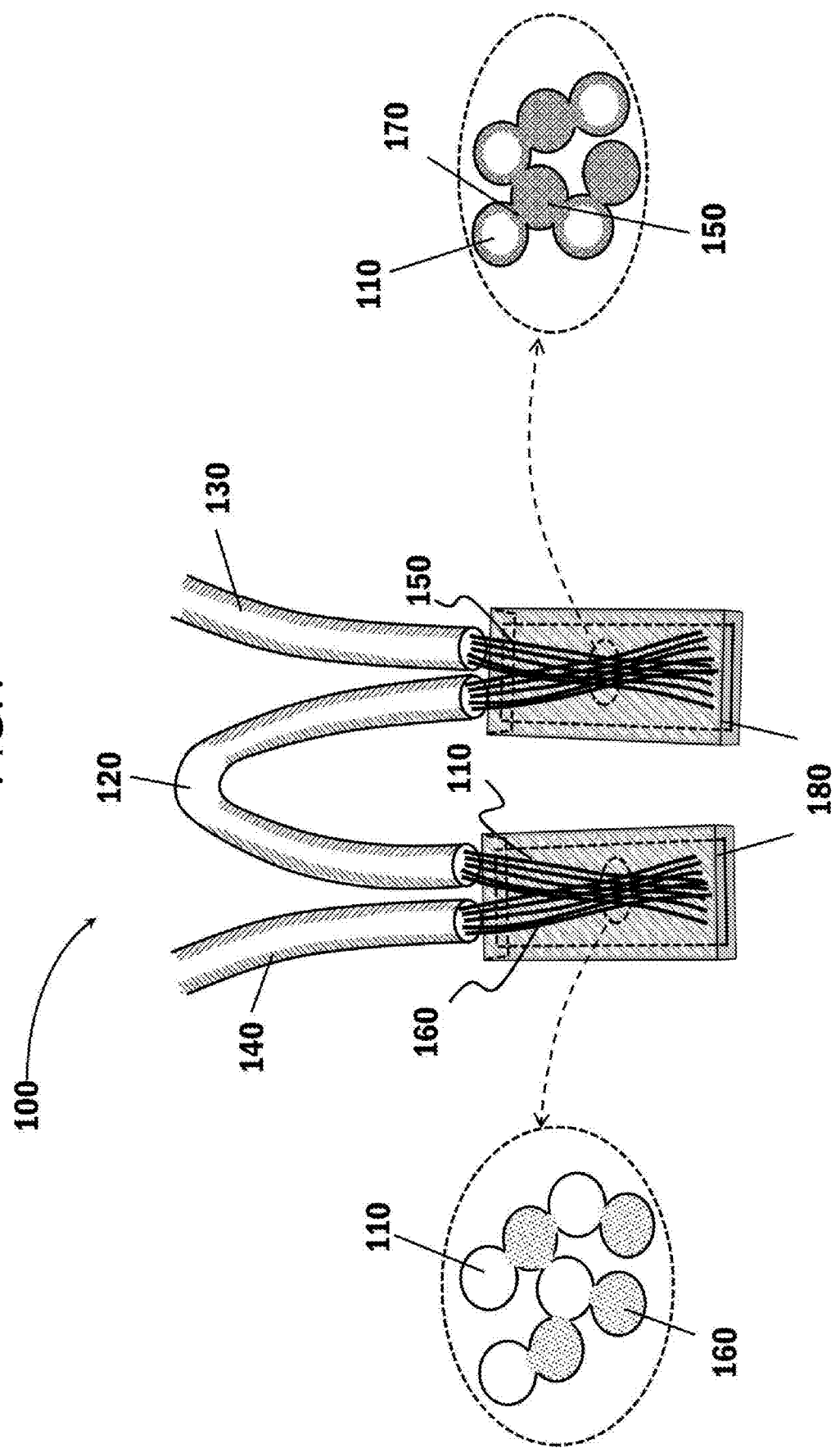
FIG. 1 is a schematic drawing illustrating the superconducting joint structural body of the present invention.

FIG. 1 is a schematic drawing illustrating the superconducting joint structural body of the present invention.

The superconducting joint structural body 100 of the present invention includes: a joint strip 120 having one or more of Nb alloy strips 110 to which an element M is added; a $Nb_3Sn$ superconducting wire 130; and a NbTi wire 140. The $Nb_3Sn$ superconducting wire 130 and the NbTi wire 140 are jointed by the one or more of Nb alloy strips 110. The one or more of Nb alloy strips 110 are characterized in that the recovery temperature and the recrystallization temperature of Nb increase as a result of addition of the element M. The degrees of these increased temperatures are not particularly limited, as long as the recovery temperature and the recrystallization temperature of Nb are equal to or higher than the temperature of formation of $Nb_3Sn$ (specifically, 600° C.).

In more detail, the $Nb_3Sn$ superconducting wire 130 has one or more of $Nb_3Sn$ superconducting cores 150, and the NbTi wire 140 has one or more of NbTi cores 160. One end of the joint strip 120 is jointed with the $Nb_3Sn$ superconducting wire 130 by contact with each of the one or more of Nb alloy strips 110 and each of the one or more of $Nb_3Sn$ superconducting cores 150 through a $Nb_3Sn$ superconducting layer 170 interposed therebetween. The $Nb_3Sn$ superconducting layer 170 may be a layer that constitutes each of the one or more of $Nb_3Sn$ superconducting cores 150, or may be a layer formed on each surface of the one or more of Nb alloy strips 110.

The other end of the joint strip 120 is jointed with the NbTi wire 140 by mutual contact with each bare surface of the one or more of Nb alloy strips 110 and each bare surface of the one or more of NbTi cores 160. Herein, the bare surface intends to be an activated metal surface that does not have oxide film or the like as well as that is not exposed to the air. The confirmation of the mutual contact that each bare surface of the one or more of Nb alloy strips 110 and each bare surface of the one or more of NbTi cores 160 are in direct contact with each other can be evaluated on the basis of the critical current characteristics.

The inventors of the present application have found that by the use of the one or more of Nb alloy strips 110 of which the recovery temperature and the recrystallization temperature increase, the superconducting joint structural body 100 in which the $Nb_3Sn$ superconducting wire 130 and the NbTi wire 140 are jointed can be provided by a manufacturing method described below.

Hereinafter, as for the present invention, the individual constituent elements thereof will be detailed.

Although the element M is not particularly limited as long as the recovery and recrystallization temperatures of Nb can be increased, at least one selected from the group consisting of hafnium (Hf), titanium (Ti), tantalum (Ta), zirconium (Zr), and tungsten (W) is preferred. Among them, Hf is more preferred. Since Hf can increase the recovery and recrystallization temperatures of Nb by 200° C., Hf is advantageous in view of the manufacturing method described below.

Although the additive amount of the element M is not limited as long as the superconducting properties of the Nb alloy are not lost, it is preferable to be a range from 0.2 at % or more and 10 at % or less. It is preferable to be the additive amount of 0.2 at % or more because a critical magnetic field of 0.2 T or more can be achieved thereby and is advantageous for practical use. It is preferable to be the additive amount of 10 at % or less because it can be avoided that the element M becomes to be possibly less solid-soluble into the Nb alloy. From the viewpoint of increasing the recovery and recrystallization temperatures of Nb as well as of the critical magnetic field, it is more preferable that the additive amount of the element M is in a range from 1 at % or more to 6 at % or less, and it is furthermore preferable that the additive amount of the element M is in a range from 1.5 at % or more to 3 at % or less. In a case where the element M is composed of two or more elements, the total amount of additive amount of each element constituting the element M may fall within the above ranges. The content of the element M in each of the one or more of Nb alloy strips is measured by energy dispersive X-ray spectroscopy (EDS).

The joint strip 120 preferably has a first stabilizer 210 (FIG. 2) that covers the Nb alloy strip 110. The first stabilizer is made of a normal conducting metal material, and can easily detour and stabilize the current by thermal disturbance and so on.

The first stabilizer 210 may be preferably made of the material selected from the group consisting of copper metal, copper alloy, silver metal, and silver alloy. All of these materials have been known as normal conducting metal materials. Among them, copper metal is preferred from the viewpoint of price and workability.

Figure 2:
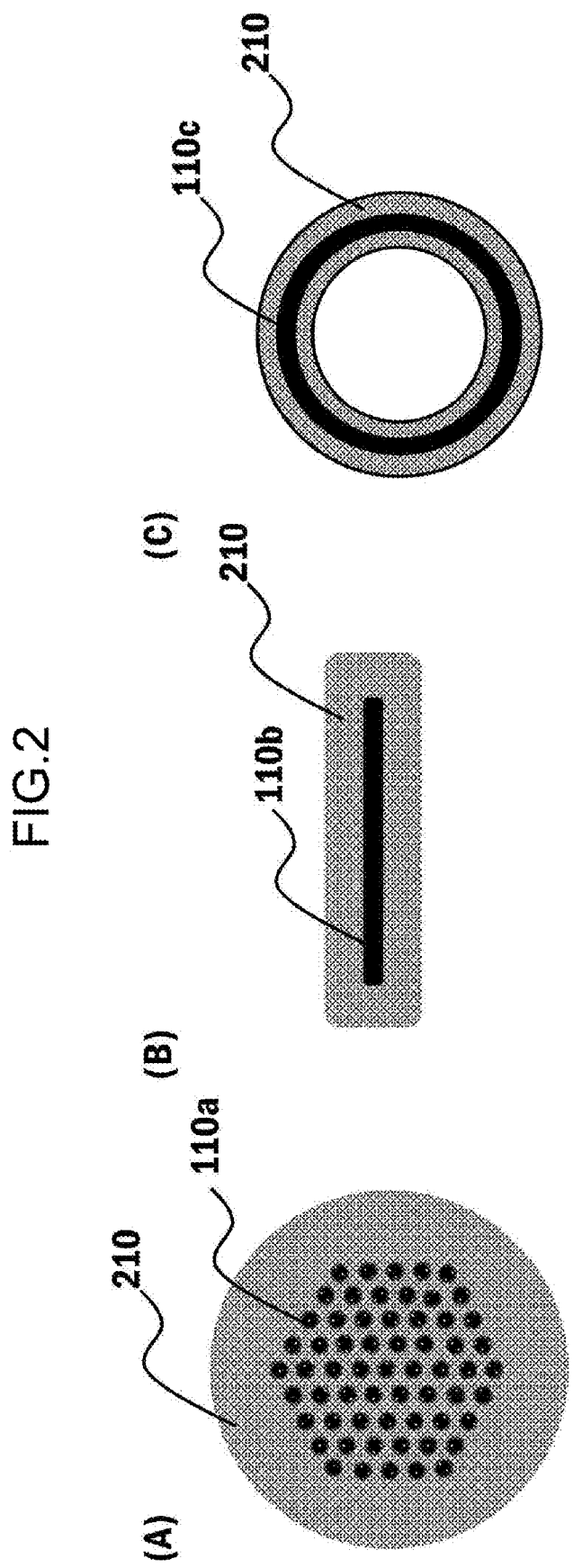
FIG. 2 contains schematic drawings illustrating exemplary shapes of the one or more of Nb alloy strips. Herein.

FIG. 2 contains schematic drawings illustrating exemplary shapes of the one or more of Nb alloy strips.

FIG. 2(A) illustrates the case where each strip shape of the one or more of Nb alloy strips is a core 110a, but the above shape is not limited to be a core (specifically, a core for a multi-core wire). Each strip shape of the one or more of Nb alloy strips may be a sheet 110b as illustrated in FIG. 2(B), or may be a pipe 110c as illustrated in FIG. 2(C). FIG. 2 shows the aspects of the cases where each strip of the one or more of Nb alloy strips having the respective shapes (i.e., forms) is covered with the first stabilizer 210.

In a case where each strip shape of the one or more of Nb alloy strips is a core 110a as illustrated in FIG. 2 (A), there is the advantage in terms of suppressing superconductor-specific thermal runaway called flux jump. In a case where each strip shape of the one or more of Nb alloy strips is a sheet 110b as illustrated in FIG. 2(B), there is the advantage because the one or more of Nb cores to be processed into the one or more of $Nb_3Sn$ superconducting cores 150 can be bundled so as to fold the sheet 110b in the manufacturing process described below. In a case where each strip shape of the one or more of Nb alloy strips is a pipe 110c as illustrated in FIG. 2(C), there is the advantage because the one or more of Nb cores to be processed into the one or more of $Nb_3Sn$ superconducting cores 150 can be bundled simply by running it through the pipe 110c in the manufacturing process described below.

Figure 3:
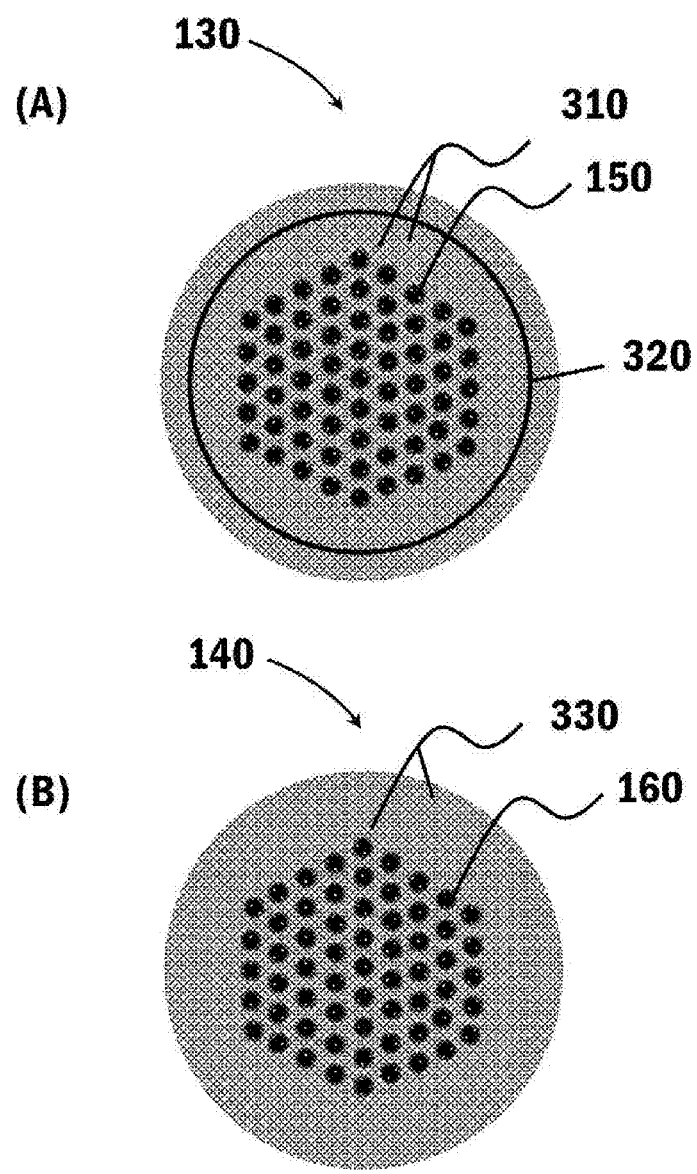
FIG. 3 contains schematic drawings illustrating the $Nb_3Sn$ superconducting wire and the NbTi wire. Herein, FIG. 3(A) schematically illustrates a cross section of the $Nb_3Sn$ superconducting wire, and FIG. 3(B) schematically illustrates a cross section of the NbTi wire.

FIG. 3 contains schematic drawings illustrating the $Nb_3Sn$ superconducting wire and the NbTi wire.

FIGS. 3(A) and (B) illustrate cross sections of the $Nb_3Sn$ superconducting wire and the NbTi wire, respectively. In the $Nb_3Sn$ superconducting wire 130, the $Nb_3Sn$ superconducting cores 150 of a multi-core wire are covered with the second stabilizer 310 and/or embedded in the second stabilizer 310. In the present invention, the $Nb_3Sn$ superconducting wire 130 may be an ordinarily used $Nb_3Sn$ superconducting wire that can be obtained from a $Nb_3Sn$ precursor wire described below by means of an annealing treatment. Even in this case, the second stabilizer 310 is made of a normal conducting metal material, and may be preferably made of the material selected from the group consisting of copper metal, copper alloy, silver metal, and silver alloy.

The $Nb_3Sn$ superconducting wire 130 may have a diffusion barrier layer 320. The diffusion barrier layer 320 can avoid the diffusion of element when manufactured from the $Nb_3Sn$ precursor wire described below by means of an annealing treatment. Such a diffusion barrier layer 320 may be made of tantalum (Ta), niobium (Nb), or alloy thereof. By the use of these metals, the diffusion of Sn and Nb is more preferably avoided.

In the NbTi wire 140, the NbTi cores 160 of a multi-core wire thereof may be covered with the third stabilizer 330 and/or embedded in the third stabilizer 330. Even in this case, the third stabilizer 330 is made of a normal conducting metal material, and may be preferably made of the material selected from the group consisting of copper metal, copper alloy, silver metal, and silver alloy. The first to third stabilizers may be different or the same.

Also, each of the one or more of NbTi cores 160 can use a NbTi core that is ordinarily used and available. In this case, it is preferable that the composition of Ti in the alloy of NbTi falls into a range from 8 at % or more to 90 at % or less. In a case of falling into this range, each of the one or more of NbTi cores can be processed by wire drawing, and can maintain higher properties. It is more preferable that the composition of Ti in the NbTi alloy falls into a range from 50 at % or more to 70 at % or less.

In the superconducting joint structural body 100 of the present invention, each of a portion where each of the one or more of Nb alloy strips 110 and each of the one or more of $Nb_3Sn$ superconducting cores 150 are in contact with each other through the $Nb_3Sn$ superconducting core layer 170 interposed therebetween and each bare surface of the one or more of Nb alloy strips 110 and each bare surface of the one or more of NbTi cores 160 are in mutual contact may be preferably covered by means of a crimp tube 180 as illustrated in FIG. 1. This enables to promote, in the manufacturing method described below, the joint between the one or more of Nb alloy strips 110 and the one or more of $Nb_3Sn$ superconducting cores 150 as well as the joint between the one or more of Nb alloy strips 110 and the one or more of NbTi cores 160.

The crimp tube 180 is not particularly limited as long as it has a Vickers hardness of 60 Hv or more, and is exemplarily made of the material selected from the group consisting of tantalum (Ta), niobium (Nb), copper-nickel alloy (CuNi), and stainless steel. Each of these materials has a Vickers hardness from 60 Hv or more to 300 Hv or less. In a case where the joint between the one or more of Nb alloy strips 110 and the one or more of $Nb_3Sn$ superconducting cores 150 are performed in such a manner that the crimp tube 180 and the one or more of $Nb_3Sn$ superconducting cores 150 are in direct contact with each other, it is preferable that the material of the crimp tube 180 is tantalum (Ta) in order to suppress a reaction during an annealing treatment.

According to the superconducting joint structural body 100 of the present invention, it is preferable that each length (more specifically, the length of the crimp tube 180) of the above portion where the one or more of Nb alloy strips 110 and the one or more of $Nb_3Sn$ superconducting cores 150 are in contact and covered and the above portion where the one or more of Nb alloy strips 110 and the one or more of NbTi cores 160 are in mutual contact and covered is a range from 10 mm or more to 30 mm or less. In a case of falling into this range, good superconducting properties can be obtained by the sufficient contact. As for each length of the above portions being in contact and covered as described above, it is more preferable to fall within a range from 10 mm or more to 20 mm or less, and it is furthermore preferable to fall within a range from 15 mm or more to 25 mm or less.

As described above, in the superconducting joint structural body 100 of the present invention, the $Nb_3Sn$ superconducting wire 130 and the NbTi wire 140 are jointed without using any environmentally hazardous substance such as Pb or Cd as well as with maintaining a high critical current even in a magnetic field environment of 0.5 T to 1.0 T. Therefore, the superconducting joint structural body 100 of the present invention can be applied to a nuclear magnetic resonance (NMR) apparatus for high field use. In particular, since the superconducting joint structural body 100 of the present invention do not use any environmentally hazardous substance, there is no need to apply for exclusion of Restriction of Hazardous Substances (RoHS) Directive and so on. This also enables to significantly reduce costs for manufacturing NMR. The superconducting joint structural body of the present invention preferably satisfies the critical current characteristics of at least 50 A or more, at 4.2 K, in a magnetic field environment of 0.6 T.

Next, a manufacturing process of the superconducting joint structural body 100 of the present invention will be explained.

Figure 4:
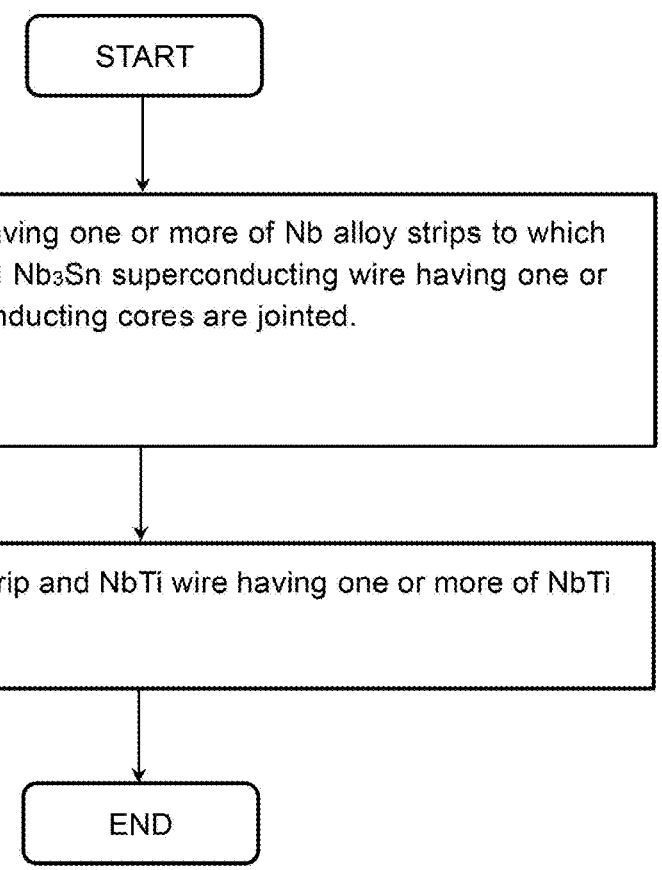
FIG. 4 is a flowchart of steps for manufacturing the superconducting joint structural body of the present invention.

FIG. 4 is a flowchart of steps for manufacturing the superconducting joint structural body of the present invention.

The step of "S410": One end of a joint strip having one or more of Nb alloy strips to which the element M is added and a $Nb_3Sn$ superconducting wire having one or more of $Nb_3Sn$ superconducting cores are jointed.

The step of "S420": The other end of the joint strip and a NbTi wire having one or more of NbTi cores are jointed.

The superconducting joint structural body 100 of the present invention is manufactured by the step of "S410" of a first jointing step and the step of "S420" of a second jointing step.

Herein, the joint strip having the one or more of Nb alloy strips to which the element M is added and the NbTi wire having the one or more of NbTi cores have been already explained referring to FIG. 1, and thus an explanation thereof will not be omitted.

Since the one or more of Nb alloy strips to which the element M making the recovery and recrystallization temperatures of Nb increase is added are used, the $Nb_3Sn$ superconducting wire can be manufactured from a $Nb_3Sn$ superconducting precursor wire (FIG. 5) described below without decreasing the properties of the one or more of Nb alloy strips even after performing an annealing treatment for forming $Nb_3Sn$ in the first jointing step. And, the one or more of Nb alloy strips and the $Nb_3Sn$ superconducting wire can be jointed through the $Nb_3Sn$ superconducting layer formed on each of the one or more of Nb alloy strips. Followed by it, in the second jointing step, it is only necessary to mechanically joint the one or more of Nb alloy strips and the NbTi wire, and thus the superconducting joint between the $Nb_3Sn$ superconducting wire and the NbTi wire can be performed without using any environmentally hazardous substances such as Pb and Cd.

In the manufacture of the superconducting joint structural body of the present invention, the $Nb_3Sn$ superconducting precursor wire is used. In this case, as the $Nb_3Sn$ superconducting precursor wire, the one or more of Nb cores that are embedded in a matrix that contains at least Cu and Sn can be used. Such a $Nb_3Sn$ superconducting precursor wire is distributed on the market and commercially available.

FIG. 5 contains schematic drawings illustrating an exemplary $Nb_3Sn$ superconducting precursor wire used for manufacturing the superconducting joint structural body of the present invention.

In a $Nb_3Sn$ superconducting precursor wire 500a illustrated in FIG. 5(A), the one or more of Nb cores 510 may be embedded in a Cu—Sn matrix 520a. The Cu—Sn matrix 520a is made of an alloy of Cu and Sn, preferably having a Sn content in a range from 5 at % or more to 10 at % or less. In a case of falling into this range, the above Cu—Sn matrix reacts with the one or more of Nb cores 510 embedded therein, thereby forming the one or more of $Nb_3Sn$ superconducting cores 150 (see FIG. 1). As a result, workability of the core wire can be achieved.

The $Nb_3Sn$ superconducting precursor wire 500a may preferably have a diffusion barrier layer 530 around the Cu—Sn matrix 520a. This enables to suppress the diffusion of Nb from the one or more of Nb cores 510 and the diffusion of Sn from the Cu—Sn matrix 520a during an annealing treatment described below. The diffusion barrier layer 530 may be made of tantalum (Ta), niobium (Nb), or alloy thereof.

The $Nb_3Sn$ superconducting precursor wire 500a may preferably have a stabilizer 540 around the Cu—Sn matrix 520a. This enables to easily detour the current, even in the case where the one or more of $Nb_3Sn$ superconducting cores returned back to the normal conduction mode due to thermal disturbance after performing the diameter reduction treatment. The material of the stabilizer 540 is the same material as the above second stabilizer 310.

A $Nb_3Sn$ superconducting precursor wire 500b illustrated in FIG. 5(B) differs from the $Nb_3Sn$ superconducting precursor wire 500a illustrated in FIG. 5(A) in the following respects: in the $Nb_3Sn$ superconducting precursor wire 500b illustrated in FIG. 5(B), a Cu matrix 520b and a Sn matrix 550 are separately provided and the one or more of Nb cores 510 are embedded only in the Cu matrix 520b. In the specification of the present application, a case where the matrix in which the one or more of Nb cores are embedded is separated into the Cu matrix and the Sn matrix is also regarded as a case where the one or more of Nb cores are embedded in the matrix that contains Cu and Sn. That is, an embodiment of the "matrix that contains at least Cu and Sn" described in the specification of the present application includes, in addition to an embodiment containing at least Cu and Sn in the same matrix as illustrated in FIG. 5(A) (that is, an embodiment in which the matrix that contains Cu is the same as the matrix containing Sn), an embodiment in which the matrix that contains at least Cu and the matrix that contains at least Sn are separated as illustrated in FIG. 5(B). Thus, the embodiment of the "one or more of Nb cores embedded in a matrix that contains at least Cu and Sn" exemplarily includes: an embodiment in which the one or more of Nb cores are embedded in the Cu—Sn matrix made of an alloy of Cu and Sn as illustrated in FIG. 5(A); an embodiment in which the matrix made of Cu and the matrix made of Sn are separately provided and the one or more of Nb cores are embedded only in the matrix made of Sn; and an embodiment in which the matrix made of Cu and the matrix made of Sn are separately provided and the one or more of Nb cores are embedded only in the matrix made of Cu as illustrated in FIG. 5(B). In a case of FIG. 5(B) in which the matrix embedding the one or more of Nb cores is separated into the Cu matrix and the Sn matrix, it is preferable that the Sn matrix 550 falls into a range from 10 at % or more to 60 at % or less with regard to the total of the Cu matrix 520b and the Sn matrix 550. In a case of falling into this range, the matrix preferably reacts with the one or more of NbTi cores 510, thereby forming the one or more of $Nb_3Sn$ superconducting cores 150 (FIG. 1). As a result, workability of the core wire can be achieved.

As is the case with the $Nb_3Sn$ superconducting precursor wire 500a, the $Nb_3Sn$ superconducting precursory wire 500b may be provided with a stabilizer 540 around the Cu matrix 520b.

Each of the $Nb_3Sn$ superconducting precursor wires illustrated in FIG. 5 is merely exemplary ones. Besides them, the $Nb_3Sn$ superconducting precursor wires disclosed in "WO 2018/198515 A1" and "WO2021/024529 A1", for example can be also used. From these points of view, it is only necessary that the one or more of NbTi cores 510 are embedded in a matrix that contains at least Cu and Sn, but the matrix (specifically, Cu matrix, Sn matrix, or Cu—Sn matrix) may further contain zinc (Zn), germanium (Ge), gallium (Ga), magnesium (Mg), aluminum (Al), or titanium (Ti).

Hereinafter, the first jointing step and the second jointing step will be detailed.

Figure 6:
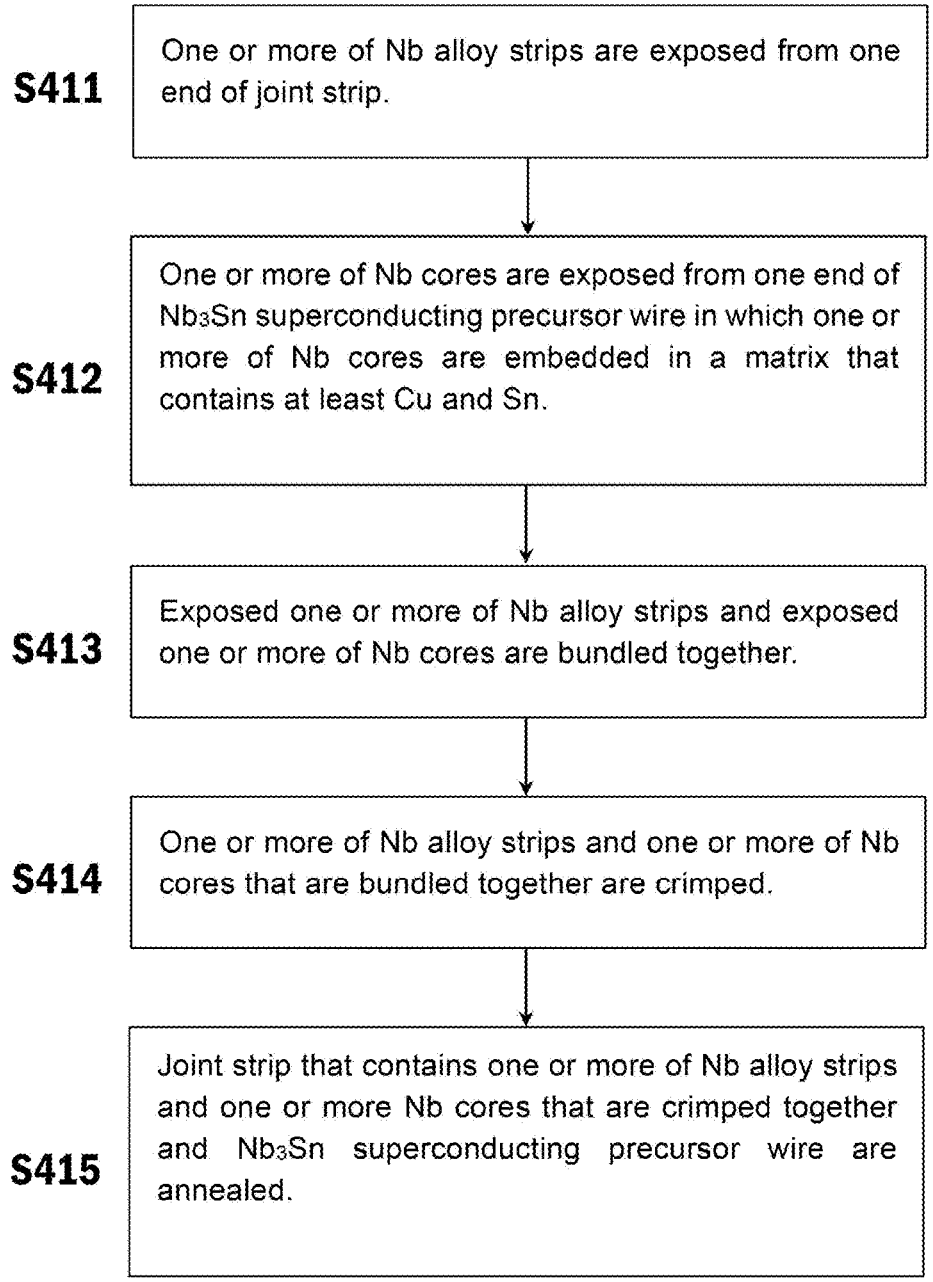
FIG. 6 is a flowchart of the first jointing step.

FIG. 6 is a flowchart of the first jointing step.

Figure 7:
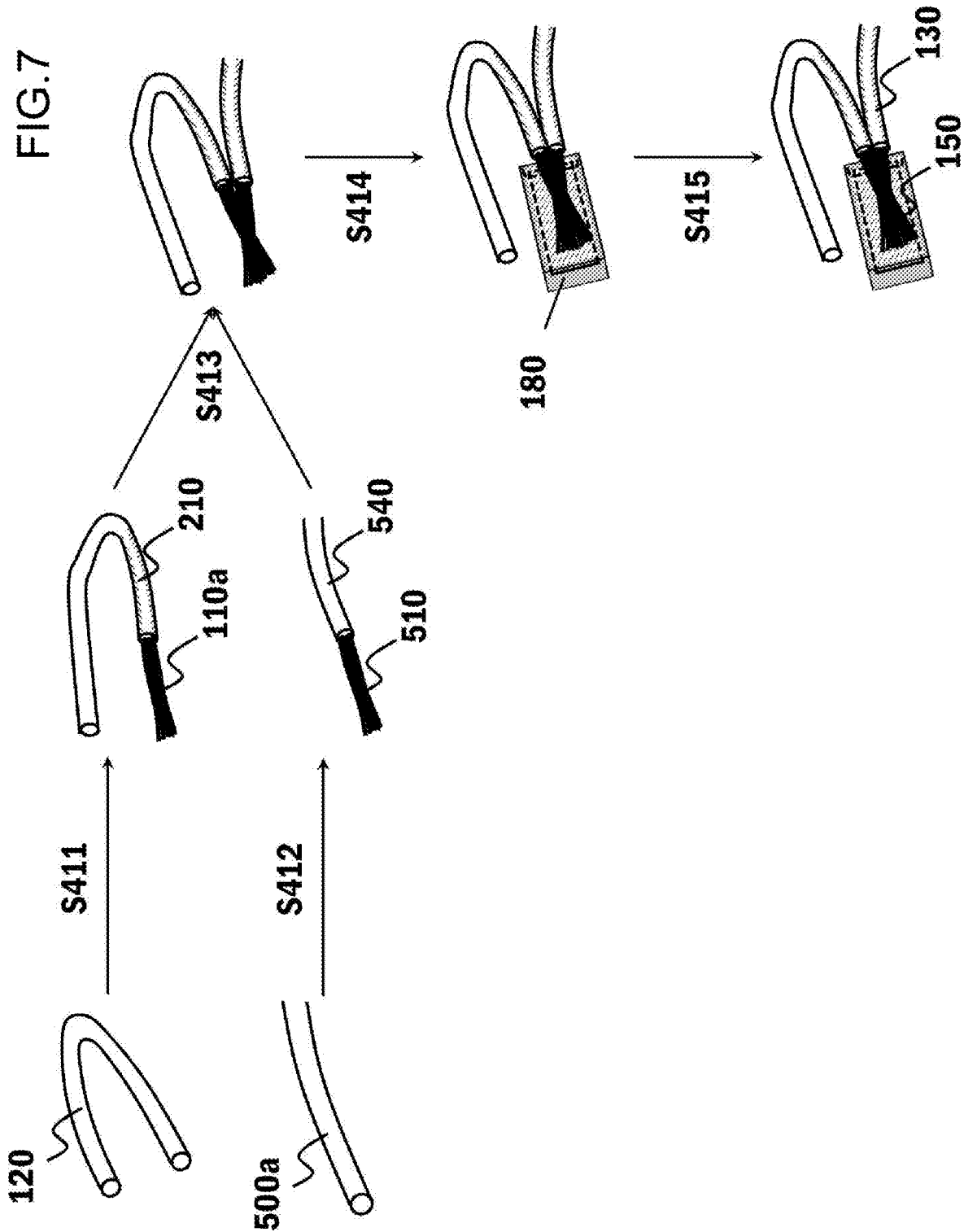
FIG. 7 illustrates a series of procedures of the first jointing step.

FIG. 7 illustrates a series of procedures of the first jointing step.

Herein, the first jointing step (S410) illustrated in FIG. 4 will be detailed referring to a case where the joint strip 120 illustrated in FIG. 1 is used as the joint strip, and the $Nb_3Sn$ superconducting precursor wire 500a illustrated in FIG. 5(A) is used as the $Nb_3Sn$ superconducting precursor wire.

The step of "S411": The one or more of Nb alloy strips (specifically, the one or more of cores) 110a are exposed from one end of the joint strip 120, wherein each of the one or more of Nb alloy strips 110a is covered with the first stabilizer 210. The above exposure method is performed by means of chemical corrosion, mechanical polishing, or a combination thereof, but is not particularly limited to these means. It is preferable that the exposed length falls into a range from 10 mm or more to 30 mm or less. In a case of falling into this range, good superconducting properties can be obtained by the sufficient contact when being bundled with the one or more of Nb cores 510 described below. It is more preferable that the exposed length falls into the range from 10 mm or more to 20 mm or less.

The step of "S412": The one or more of Nb cores 510 are exposed from one end of the $Nb_3Sn$ superconducting precursor wire 500a in which the one or more of Nb cores 510 are embedded in a matrix that contains at least Cu and Sn (i.e., Cu—Sn matrix 520a). The above exposure method is performed by means of chemical corrosion, mechanical polishing, or a combination thereof, but is not particularly limited to these means. It is preferable that chemical corrosion and mechanical polishing take place in this order. This makes the exposure easier even in the case where the $Nb_3Sn$ superconducting precursor wire 500a has the diffusion barrier layer 530. It is preferable that the exposed length falls into a range from 10 mm or more to 30 mm or less. In a case of falling into this range, good superconducting properties can be obtained by the sufficient contact when being bundled with the one or more of Nb alloy strips 110a exposed in the step of "S411". It is preferable that the exposed length falls into a range from 10 mm or more to 20 mm or less. In this case, it is paid for attention so as not to completely remove the matrix that contains Cu and Sn. This is because the remaining Cu—Sn is essential for formation of the $Nb_3Sn$ layer.

The step of "S413": The exposed one or more of Nb alloy strips 110a and the exposed one or more of Nb cores 510 are bundled together. The above bundling method may be performed by means of matching, twisting, entangling, winding or the like, but is not particularly limited to these means.

The step of "S414": The one or more of Nb alloy strips 110a and the one or more of Nb cores 510 that are bundled together in the step of "S413" are crimped. The above crimping method is performed by the steps of: applying a pressure to the one or more of Nb alloy strips 110a and the one or more of Nb cores 510 that are bundled together, thereby exposing each bare surface of them; and making each exposed bare surface of them in close contact with each other. As a result, by performing an annealing treatment described below, the $Nb_3Sn$ superconducting layer on each of the above bared surfaces is formed, and the one or more of Nb alloy strips and the one or more of Nb cores that are bundled together can be jointed thereby.

The preferred method is as follows: the bundled portion is covered with the crimp tube 180, and then the pressure is applied to the one or more of Nb alloy strips 110a and the one or more of Nb cores 510 that are bundled together in a perpendicular direction to a longitudinal direction thereof, thereby crimping them. As a result, the bare surfaces of them can be in close contact with each other. The crimp tube 180 is as already explained referring to FIG. 1. It is preferable that the pressure to be applied falls into a range from 100 MPa or more to 1 GPa or less. In a case of falling into this range, the close contact between the above bare surfaces can be promoted. It is more preferable that the pressure to be applied falls into a range from 300 MPa or more to 500 MPa or less. In a case of falling into this range, the close contact between the above bare surfaces can be promoted without causing wire breakage.

The step of "S415": The joint strip 120 that contains the one or more of Nb alloy strips and the one or more of Nb cores that are crimped together and the $Nb_3Sn$ superconducting precursor wire 500a are annealed. The annealing treatment may be an ordinary annealing treatment employed to form the $Nb_3Sn$ superconducting wire from the $Nb_3Sn$ superconducting precursor wire 500a. As a result, the one or more of Nb cores 510 reacts with the Cu—Sn matrix 520a to become the one or more of $Nb_3Sn$ superconducting cores 150, and concurrently the $Nb_3Sn$ superconducting layer 170 can be formed on each bare surface of the one or more of Nb alloy strips and the one or more of Nb cores that are bundled together. Since in the present invention, the one or more of Nb alloy strips to which the element M making the recovery temperature and the recrystallization temperature of Nb increase is added are used, the superconducting properties of the Nb alloy strip do not decrease even after the conventional annealing treatment is performed.

It is preferable that the annealing treatment is performed under the conditions of the following: in vacuum or in an inert gas atmosphere of argon (Ar), helium (He) or the like, within the temperature range from 600° C. or more to 800° C. or less. This enables to promote the formation of the one or more of $Nb_3Sn$ superconducting cores 150 and the formation of the $Nb_3Sn$ superconducting layer 170 on each of the above bare surfaces, while maintaining the high superconducting properties of the one or more of Nb alloy strips. The annealing treatment time varies depending on the length of the $Nb_3Sn$ superconducting precursor wire 500a and the number of multi-core wires, and exemplarily falls into a range from 5 hours or more to 300 hours or less.

The annealing treatment conditions may be more preferably performed in two stages within the above temperature range. Exemplary the annealing treatment conditions may include, in vacuum or an inert gas atmosphere, the stage of a duration of 50 hours or more to 150 hours or less and a temperature range from 300° C. or more to 500° C. or less; and the subsequent stage of a duration of 50 hours or more to 150 hours or less and a temperature range of 600° C. or more to 800° C. or less. Such a two-stage annealing treatment enables to promote, while maintaining the high superconducting properties of the one or more of Nb alloy strips, formation of the uniform one or more of $Nb_3Sn$ superconducting cores 150 as well as formation of the $Nb_3Sn$ superconducting layer 170 on each of the above bare surfaces.

Although in FIG. 6, it is explained that the step of "S411" and the step of "S412" are performed in this order, this order may be also performed in the order of the step of "S412" and then the step of "S411".

Figure 8:
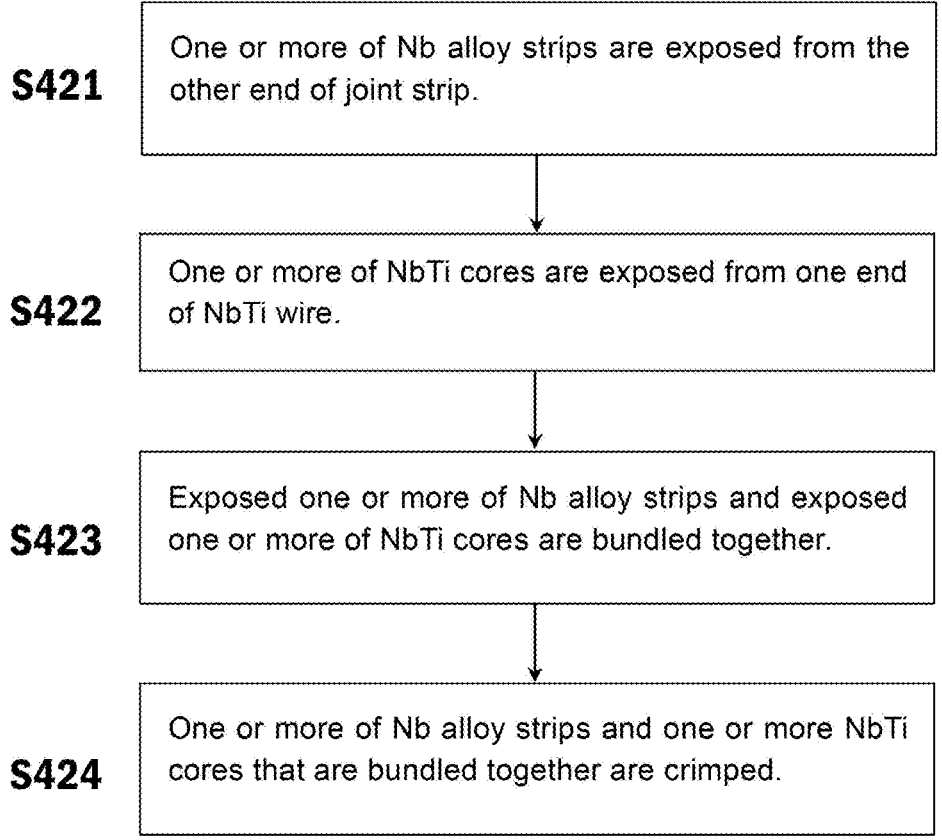
FIG. 8 is a flowchart of the second jointing step.

FIG. 8 is a flowchart of the second jointing step.

Figure 9:
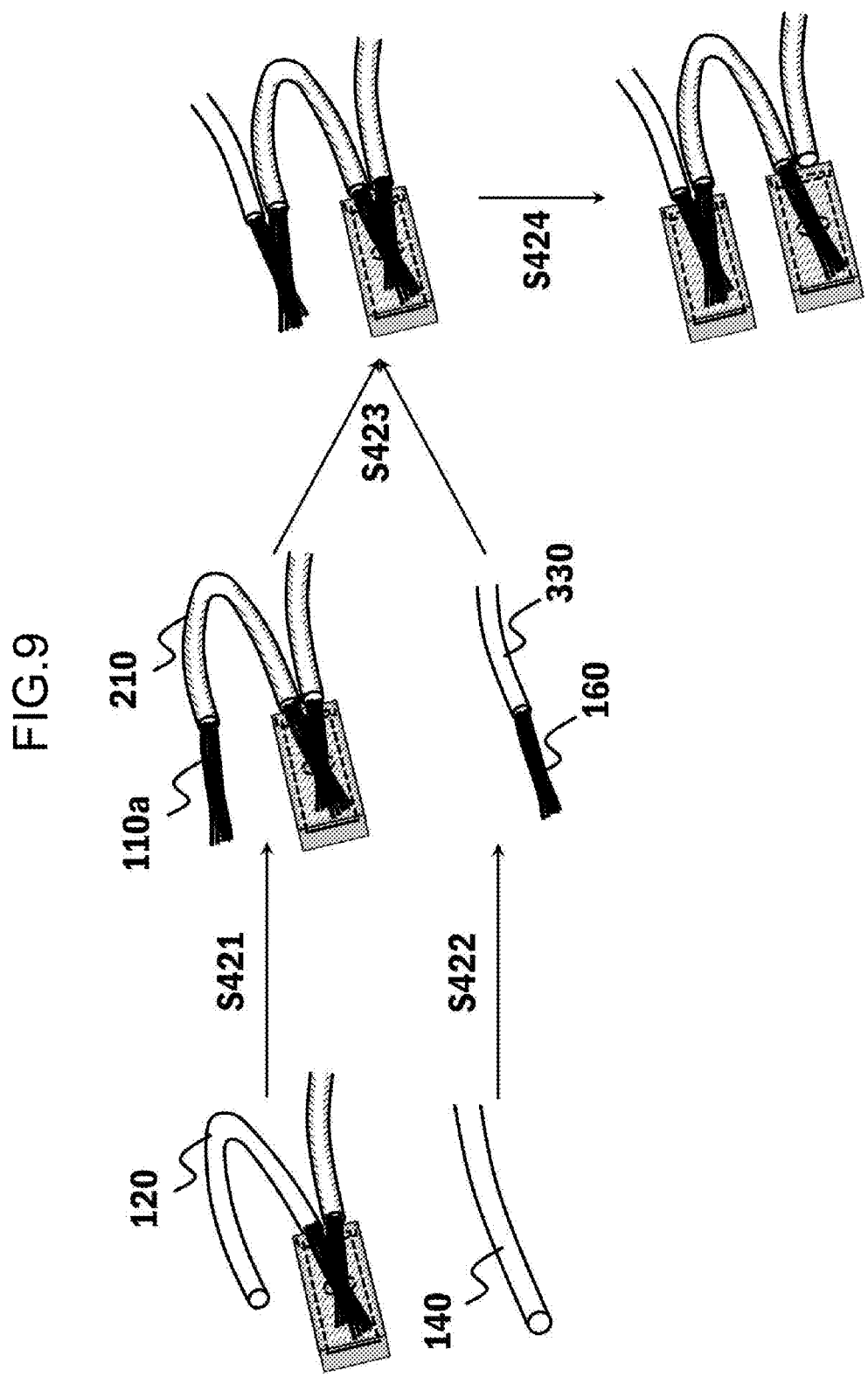
FIG. 9 illustrates a series of procedures of the second jointing step.

FIG. 9 illustrates a series of procedures of the second jointing step.

The step of "S421": The one or more of Nb alloy strips 110a are exposed from the other end of the joint strip 120 wherein each of the one or more of Nb alloy strips 110a is covered with the first stabilizer 210. The step of "S421" may be a method similar to exposure method in the step of "S411". It is preferable that the exposed length falls into a range from 10 mm or more to 30 mm or less. In a case of falling into this range, good superconducting properties can be obtained by the sufficient contact when being bundled with the one or more of Nb cores 160 described below. It is more preferable that the exposed length falls into a range from 15 mm or more to 25 mm or less. Herein, the other end of the joint strip 120 is jointed with the $Nb_3Sn$ superconducting wire 130 in the above first jointing step.

The step of "S422": The one or more of NbTi cores 160 are exposed from one end of the NbTi wire 140. The above exposure method is performed by means of chemical corrosion, mechanical polishing, or a combination thereof, but is not particularly limited to these means. It is preferable that the exposed length falls into a range from 10 mm or more to 30 mm or less. In a case of falling into this range, good superconducting properties can be obtained by the sufficient contact when being bundled with the one or more of Nb alloy strips 110a exposed in the step of "S421". It is more preferable that the exposed length falls into a range from 15 mm or more to 25 mm or less.

The step of "S423": The exposed one or more of Nb alloy strips 110a and the exposed one or more of NbTi cores 160 are bundled together. The above bundling method may be performed by means of matching, twisting, entangling, winding or the like, but is not particularly limited to these means.

The step of "S424": The one or more of Nb alloy strips and the one or more of NbTi cores that are bundled together in the step of "S423" are crimped. The above crimping method is performed by the steps of: applying the pressure to the one or more of Nb alloy strips 110a and the one or more of NbTi cores 160 that are bundled together, thereby exposing each bare surface of them; and making each exposed bare surface of them in close contact with each other. As a result, the one or more of Nb alloy strips and the one or more of NbTi cores that are bundled together can be jointed on the bare surfaces of them.

The preferred method is as follows: the bundled portion is covered with the crimp tube 180, and the thus the pressure is applied to the one or more of Nb alloy strips 110*a* and the one or more of NbTi cores 160 that are bundled together in a perpendicular direction to a longitudinal direction thereof, thereby crimping them. As a result, the bare surfaces of them can be in close contact with each other. It is preferable that the pressure to be applied falls into a range from 100 MPa or more to 1 GPa or less. In a case of falling into this range, the close contact between the above bare surfaces can be promoted. It is more preferable that the pressure to be applied falls to a range from 300 MPa or more to 500 MPa or less. In a case of falling into this range, the close contact between the above bare surfaces can be promoted without causing wire breakage.

In this way, the superconducting joint structural body 100 of the present invention can be obtained.

Next, the present invention will be detailed referring to specific examples. However, it is noted that the present invention is not limited to these examples.

EXAMPLES

Reference Example

As for a NbTi wire (National Bureau of Standards (NBS) standard sample) having a wire diameter of 0.5 mm wherein the NbTi wire is made of 180 NbTi cores embedded in a Cu matrix, the changes in the critical current characteristics before and after annealing treatment were examined. The annealing treatment was performed under the following conditions: in vacuum and at 685° C. for 100 hours. Compositional percentage of Ti contained in the NbTi cores was 60 at %. The wire was immersed in liquid helium, and critical current was measured when applying an external magnetic field. The results are summarized in FIG. 10.

Figure 10:
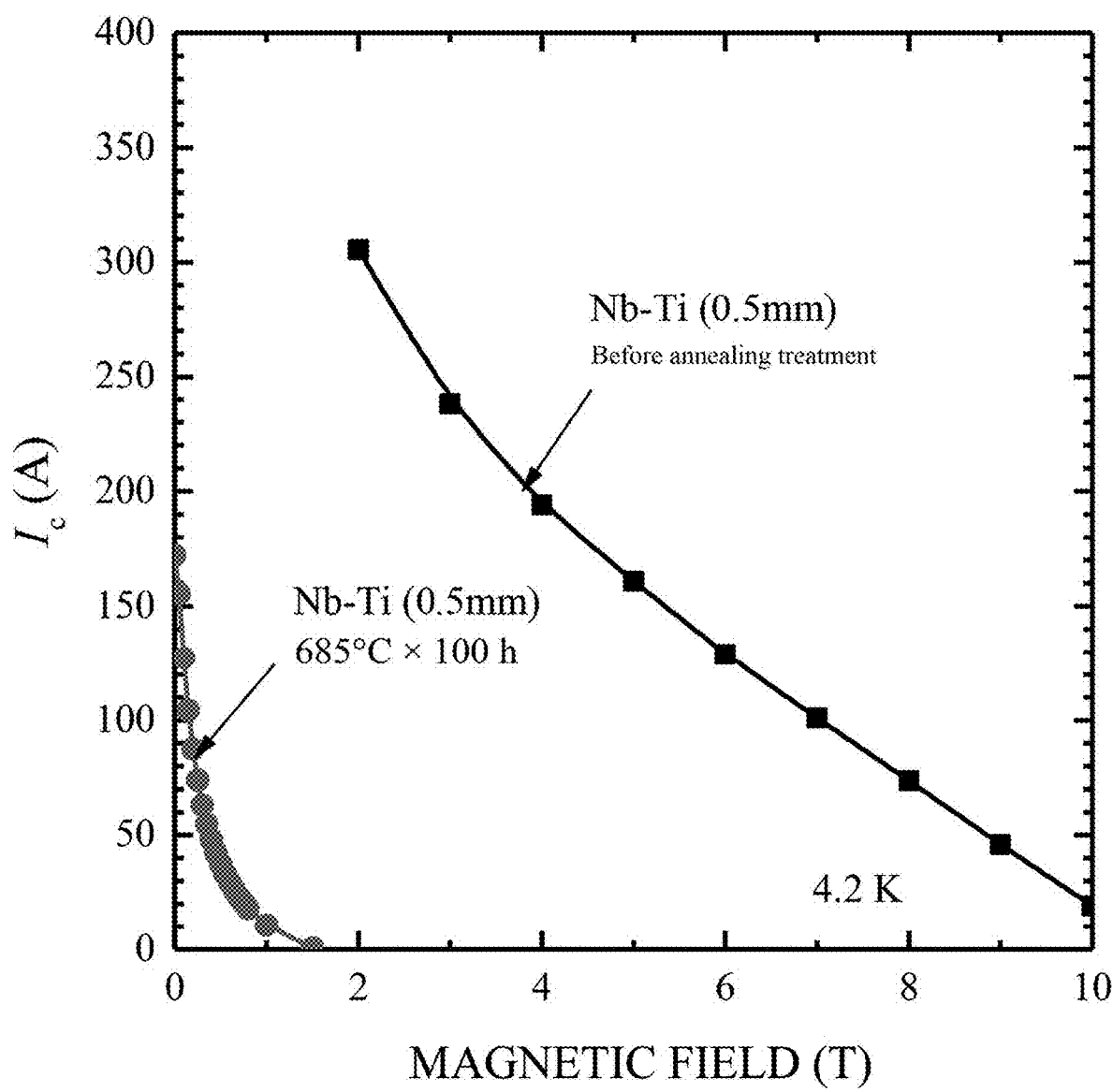
FIG. 10 is a drawing illustrating the critical current characteristics of the NbTi wire (i.e., Reference Example) before and after performing an annealing treatment.

FIG. 10 is a drawing illustrating the critical current characteristics of the NbTi wire before and after performing an annealing treatment.

According to FIG. 10, the critical current of NbTi wire before performing the annealing treatment shows a high value, but the critical magnetic field of the NbTi wire dramatically decreases after performing the annealing treatment at the temperature of more than 600° C. corresponding to the temperature of formation of $Nb_3Sn$, and also the critical current thereof decreased. The critical current of the NbTi wire after performing the annealing treatment shows to be less than 100 A even in a magnetic field of 0.2 T. The reason is as follows. Along with causing disappearance of a nanostructure such as dislocation cell in the NbTi cores by the above annealing treatment, aggregation of nanoscale ribbon-like α-Ti that serves as a flux pinning point occurs, thereby losing the flux pinning ability of the NbTi cores. As a result, the above decrease in the critical current occurs.

Next, as for the following two Nb alloy wires: a Nb alloy wire having a wire diameter of 1 mm wherein the Nb alloy wire is made of nineteen Nb-2 at % Hf cores embedded in a Cu matrix; and a Nb alloy wire having a wire diameter of 1 mm wherein the Nb alloy wire is made of nineteen Nb-4 at % Ta-1 at % Hf cores embedded in a Cu matrix, the changes in the critical current characteristics before and after annealing treatment were examined. The above Nb alloy wires were manufactured as follows.

Each of Nb-2 at % Hf alloy melted by arc melting and Nb-4 at % Ta-Tat % Hf alloy melted by arc melting was processed into a rod having a diameter slightly less than 6 mm by swaging processing, and inserted into a Cu tube having an outer/inner diameter of 8 mm/6 mm. Each resultant was subjected to swaging processing and die drawing processing to separately manufacture a Cu/Nb—Hf single-core wire having an outer diameter of 1 mm and a Cu/Nb—Ta—Hf single-core wire having an outer diameter of 1 mm. Next, for each single-core wire manufactured thereby, the same nineteen single-core wires were bundled together, and then the bundled inserted into a Cu tube having an outer diameter/inner diameter of 7.5 mm/5.1 mm, and again subjected to swaging processing and die drawing processing to separately manufacture the above Cu/Nb—Hf wire having an outer diameter of 1 mm as the wire diameter and the above Cu/Nb—Ta—Hf wire having an outer diameter of 1 mm as the wire diameter.

As for each of the above Cu/Nb—Hf wire and the above Cu/Nb—Ta—Hf wire, the changes in the critical current characteristics before and after performing the annealing treatment were examined. The annealing treatment was performed under the following conditions: in vacuum and at 685° C. for 100 hours. The results are summarized in FIG. 11.

Figure 11:
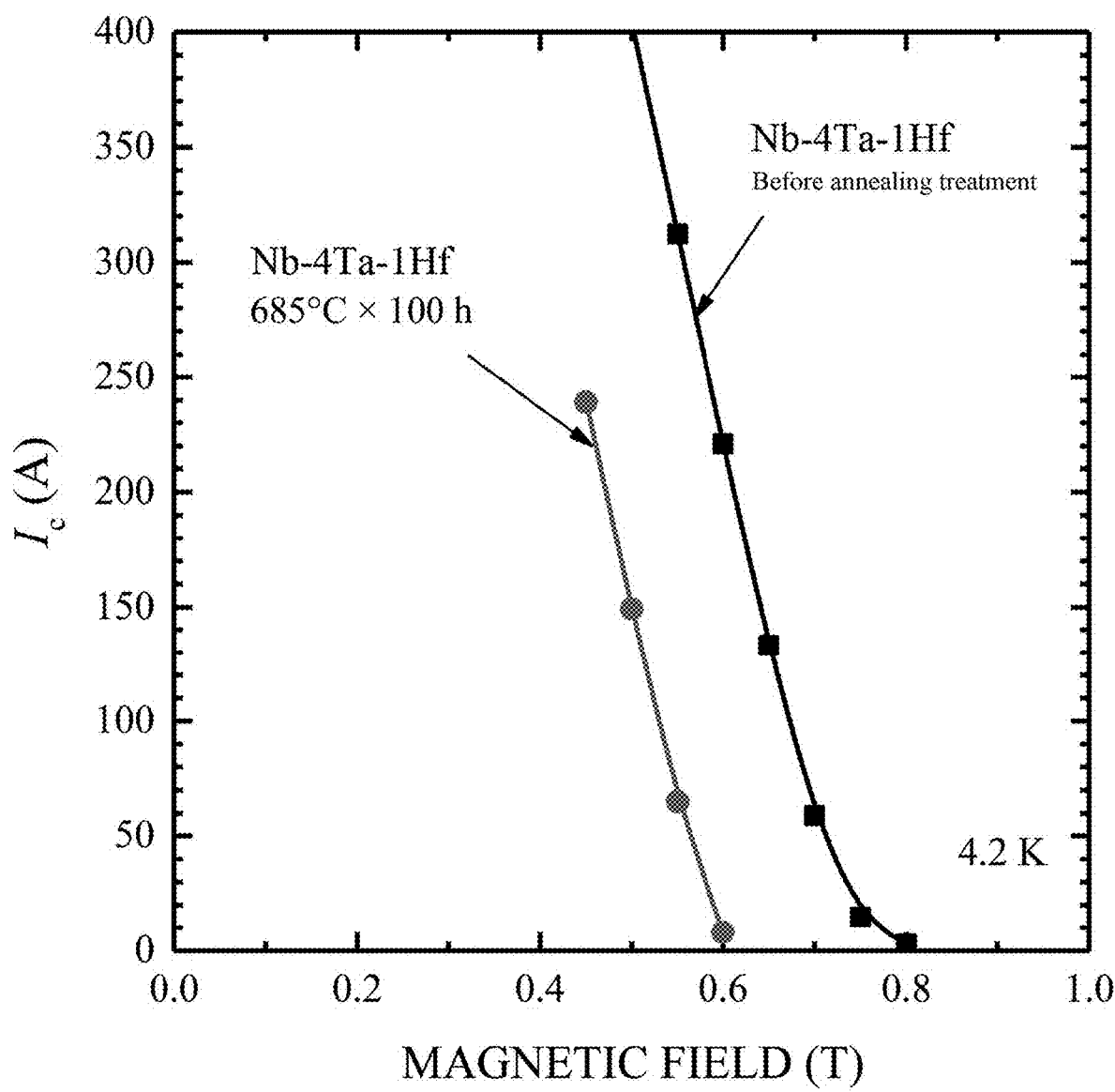
FIG. 11 is a drawing illustrating the critical current characteristics of the Nb—Ta—Hf wire (i.e., Reference Example) before and after performing an annealing treatment.

FIG. 11 is a drawing illustrating the critical current characteristics of the Nb—Ta—Hf wire (Nb-4 at % Ta-Tat % Hf wire) before and after performing an annealing treatment. In FIG. 11, the Nb—Ta—Hf wire is denoted as Nb-4Ta-1Hf. It is noted that the drawing does not illustrate the critical current characteristics of the Nb—Hf wire before and after the annealing treatment.

According to FIG. 11, the critical current of the Nb—Ta—Hf wire only slightly decreases even after performing the annealing treatment at the temperature of more than 600° C. corresponding to the temperature of formation of $Nb_3Sn$, and still maintains the high critical current even at 0.5 T. Although not illustrated, it has been also confirmed that the Nb—Hf wire maintains a high critical current at 0.8 T even after performing the annealing treatment. As described above, the Nb alloy wire to which the element of Hf, Ta or the like is added as the element M increases the recovery temperature and the recrystallization temperature of Nb, and thus it has been found to maintain the high critical current even after performing the annealing treatment at the temperature equal to or higher than the temperature of formation of $Nb_3Sn$. It has been demonstrated from the above results that the Nb alloy to which the element M is added is effective for the joint strip to which the $Nb_3Sn$ superconducting precursor wire is jointed.

Also, as illustrated in FIG. 4, it has been also confirmed that the joint between the joint strip and the $Nb_3Sn$ superconducting precursor wire wherein the joint requires the annealing treatment at the temperature equal to or higher than the temperature of formation of $Nb_3Sn$ (see the step of "Step S410") and the joint between the joint strip and the NbTi wire (see the step of "Step S420") is necessary to be performed in this order.

Example 1

In "Example 1", the Nb—Ta—Hf (specifically, Nb-4 at % Ta-1 at % Hf) wire used in the above "Reference Example" was employed as the joint strip, and the superconducting joint structural body in which the $Nb_3Sn$ superconducting wire and the NbTi wire were jointed according to the method illustrated in FIG. 4 was manufactured.

As a $Nb_3Sn$ precursor wire, the $Nb_3Sn$ precursor wire in which 1045 Nb cores are embedded in a matrix formed by separately arranging Cu and Sn as illustrated in FIG. 5(B) was prepared. Herein, a diffusion barrier layer made of Nb was provided between the area that contains Cu, Sn and Nb and the outermost Cu. The compositional percentage of Sn in the matrix was 14 at %, each diameter of the Nb cores was 11 μm, and the thickness of the diffusion barrier layer was 15 μm. The NbTi wire used herein was same as the NbTi wire used in Reference Example.

The above Nb—Ta—Hf wire as the joint strip was jointed with the above $Nb_3Sn$ superconducting wire (see the step of "S410" in FIG. 4). Specifically, the above Nb—Ta—Hf wire was cut into 8 cm lengths, and the Nb—Ta—Hf cores as the Nb alloy strips were exposed from one end thereof (see the step of "S411" in FIGS. 6 and 7). A 15 mm-long end portion of the above Nb—Ta—Hf wire was immersed in nitric acid to remove the Cu (copper) matrix of the stabilizer. Next, the Nb cores were exposed from one end of the $Nb_3Sn$ superconducting precursor wire (see the step of "S412" in FIGS. 6 and 7). The outermost Cu was removed, with nitric acid, from a 15 mm-long end portion of the $Nb_3Sn$ superconducting precursor wire, and the diffusion barrier layer was then removed by mechanically polishing with a sandpaper. In this process, it was confirmed that the Cu matrix and the Sn matrix that are around the Nb cores remains without being completely removed.

Next, the exposed Nb—Ta—Hf cores and the exposed Nb cores were bundled by means of twisting and entangling (see the step of "S413" in FIGS. 6 and 7). The bundled portion was crimped (see the step of "S414" in FIGS. 6 and 7). The bundled portion was inserted into a tantalum (Ta) tube as a crimp tube having an outer diameter/inner diameter of 3.6 mm/2.5 mm, and then a pressure of 400 MPa was applied thereto by means of a hydraulic press. Next, the Nb—Ta—Hf wire and the $Nb_3Sn$ superconducting precursor wire that include the crimped portion were annealed (see the step of "S415" in FIGS. 6 and 7). The annealing treatment was performed under the following conditions: in vacuum and at 390° C. for 100 hours, and then at 685° C. for 100 hours. In this way, the above $Nb_3Sn$ superconducting wire was produced from the above $Nb_3Sn$ superconducting precursor wire, and the above Nb—Ta—Hf wire and the above $Nb_3Sn$ superconducting wire were jointed through the $Nb_3Sn$ superconducting layer interposed therebetween.

Next, the other end of the above Nb—Ta—Hf wire and the above NbTi wire having the NbTi cores were jointed (see the step of "Step S420" in FIG. 4). Specifically, the Nb—Ta—Hf cores were exposed from the other end of the above Nb—Ta—Hf wire (see the step of "Step S421" in FIGS. 8 and 9). A 20 mm-long end portion of the Nb—Ta—Hf wire was immersed in nitric acid, to remove the Cu matrix (i.e., the third stabilizer). Next, the NbTi cores were exposed from one end of the above NbTi wire (see the step of "Step S422" in FIGS. 8 and 9). The Cu matrix was removed, with nitric acid, from a 20 mm-long end portion of the above NbTi wire.

Next, the exposed Nb—Ta—Hf cores and the exposed NbTi cores were bundled by means of twisting and entangling (see the step of "Step S423" in FIGS. 8 and 9). The bundled portion was crimped (see the step of "Step S424" in FIGS. 8 and 9). The bundled portion was inserted into a tantalum (Ta) tube as a crimp tube having an outer diameter/inner diameter of 3.6 mm/2.5 mm, and then a pressure of 400 MPa was applied thereto by means of a hydraulic press. In this way, the above Nb—Ta—Hf wire and the above NbTi wire were jointed by making each bare surface of them in close contact with each other. By the use of the joint strip obtained in this way, the superconducting joint structural body was obtained.

The superconducting joint structural body of "Example 1" was observed under a scanning electron microscope (SEM, from JEOL Ltd.) equipped with an energy dispersive X-ray analyzer (EDS) and an element mapping thereof was examined. The results are illustrated in FIG. 12.

Figure 12:
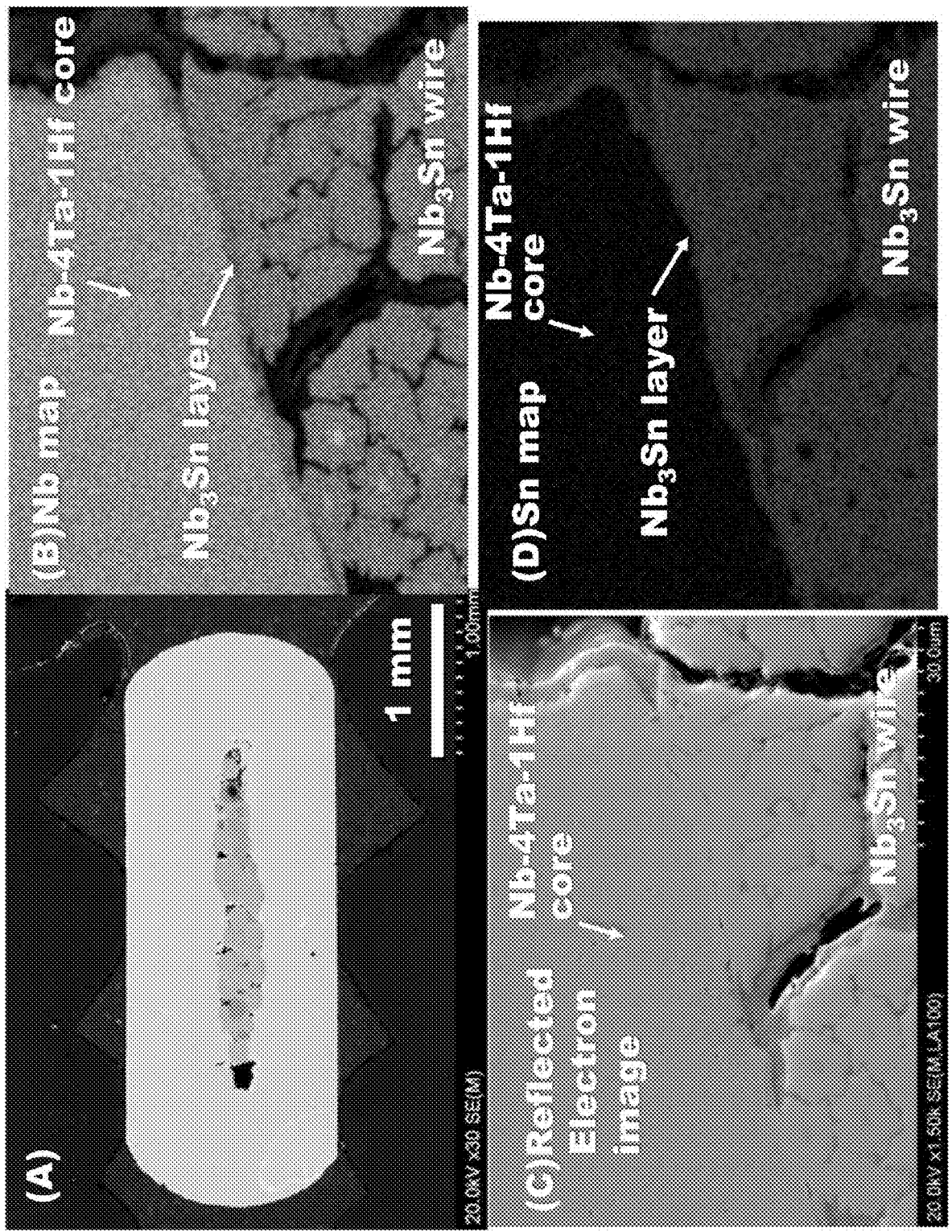
FIG. 12 contains results of observation of a cross section of the joint portion between the joint strip and the $Nb_3Sn$ superconducting wire in the superconducting joint structural body, observed under the electron microscope. Herein.

FIG. 12 contains results of observation of a cross section of the joint portion between the joint strip and the $Nb_3Sn$ superconducting wire in the superconducting joint structural body, observed under the electron microscope.

According to FIG. 12(A), it has been found that in the joint portion, the cores are in close contact with each other by means of crimping (see the step of "Step S414" in FIG. 6). According to FIG. 12(C), it has been found that the $Nb_3Sn$ superconducting cores in the $Nb_3Sn$ superconducting wire are a multi-core wire and in mutual contact as well as that the Nb—Ta—Hf core of the joint strip and the $Nb_3Sn$ superconducting core are in close contact with each other.

According to FIGS. 12(B) and (C), it has been found that the Nb—Ta—Hf core and the $Nb_3Sn$ superconducting core are in contact with each other through the $Nb_3Sn$ superconducting layer (denoted as "$Nb_3Sn$ layer" in the above figures) interposed therebetween.

The critical current characteristics of the superconducting joint structural body of "Example 1" were examined in the same way as the above "Reference Example". The results were illustrated in FIG. 13.

Figure 13:
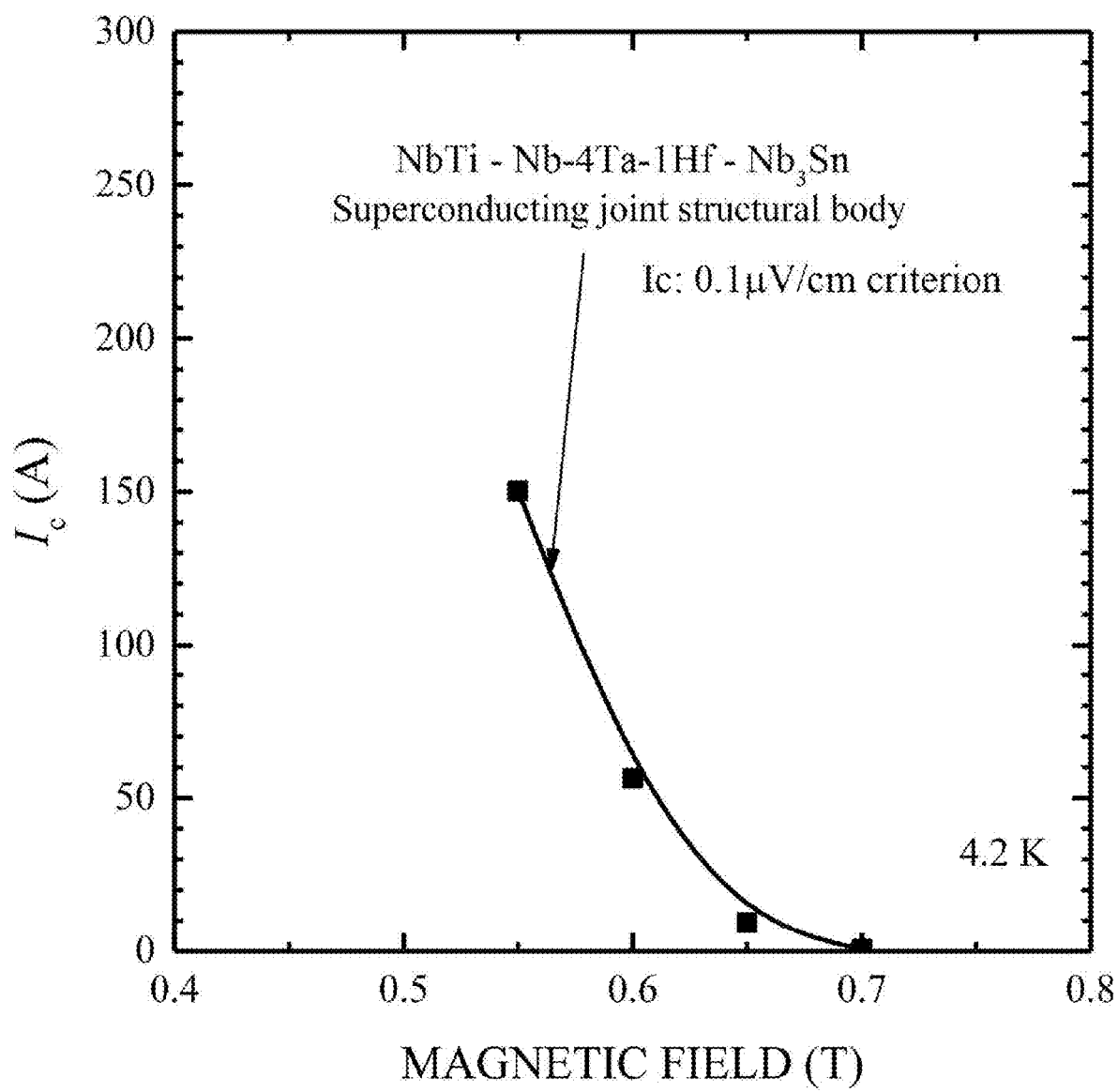
FIG. 13 is a drawing illustrating the critical current characteristics of the superconducting joint structural body of "Example 1".

FIG. 13 is a drawing illustrating the critical current characteristics of the superconducting joint structural body of "Example 1". In FIG. 13, the superconducting joint structural body (i.e., NbTi—Nb-4 at % Ta-1 at % Hf—$Nb_3Sn$ superconducting joint structural body) is denoted as "NbTi—Nb-4Ta-1Hf-$Nb_3Sn$ superconducting joint structural body".

According to FIG. 13, the superconducting joint structural body of "Example 1" shows the high critical current exceeding 150 A even in the case where 0.55 T is applied. Thus, from these results, it has been confirmed that the superconducting joint structural body in which the $Nb_3Sn$ superconducting wire and the NbTi wire are jointed without using any environmentally hazardous substances such as Pb and Cd as well as with maintaining the high superconducting properties can be provided.

Example 2

In "Example 2", a superconducting joint structural body was manufactured in the same way as "Example 1" except that the Nb—Hf (Nb-2 at % Hf) wire used in the above "Reference Example" was employed as the joint strip. The superconducting joint structural body of "Example 2" was observed by means of SEM and the critical current characteristics thereof were examined. The results were illustrated in FIG. 14.

Figure 14:
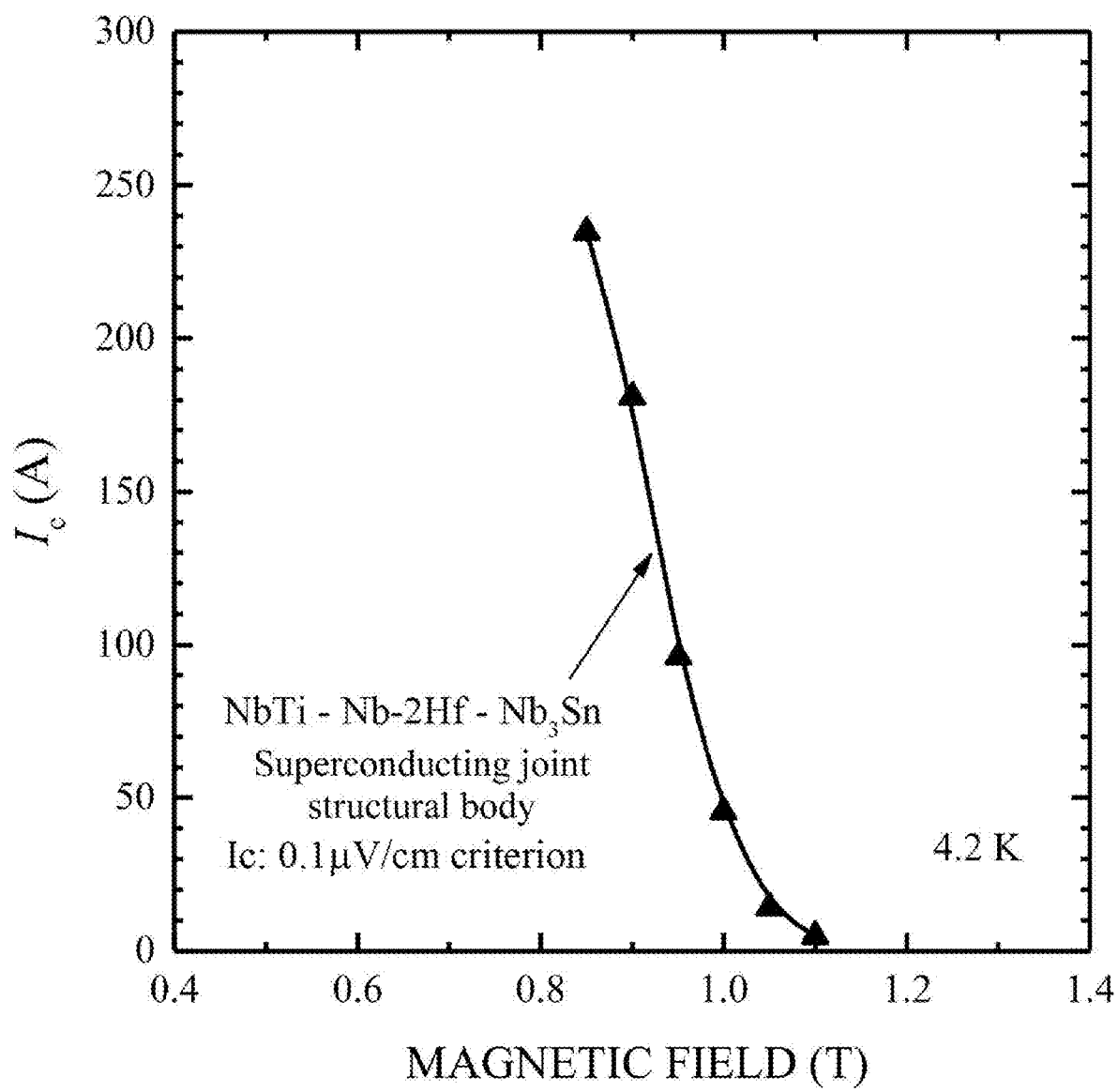
FIG. 14 is a drawing illustrating the critical current characteristics of the superconducting joint structural body of "Example 2".

FIG. 14 is a drawing illustrating the critical current characteristics of the superconducting joint structural body of "Example 2". In FIG. 14, the superconducting joint structural body (i.e., NbTi—Nb-2 at % Hf—$Nb_3Sn$ superconducting joint structural body) is denoted as "NbTi—Nb-2Hf-$Nb_3Sn$ superconducting joint structural body".

According to FIG. 14, the superconducting joint structural body of "Example 2" shows the high critical current exceeding 150 A even in the case where a magnetic field (0.9 T) higher than the magnetic field in the superconducting joint structural body in "Example 1" was applied. Although not illustrated, it has been confirmed from SEM observation that the Nb—Hf core and the $Nb_3Sn$ superconducting core are jointed through the $Nb_3Sn$ superconducting layer interposed therebetween. Thus, from these results, it has been confirmed that the superconducting joint structural body in which the $Nb_3Sn$ superconducting wire and the NbTi wire are jointed without using any environmentally hazardous substances such as Pb and Cd as well as with maintaining the high superconducting properties can be provided. Also, it has been confirmed that Hf is preferred as the element M.

INDUSTRIAL APPLICABILITY

According to the present invention, the joint structural body in which the $Nb_3Sn$ superconducting wire and the NbTi wire can be jointed without using any environmentally hazardous substances such as Pb and Cd has excellent properties and can be used in magnetic field environment of 0.5 T to 1.0 T. Thus, the joint structural body according to the present invention can be applied to a superconducting joint of a magnet for a nuclear magnetic resonance (NMR) apparatus.

REFERENCE SINGS LIST

100 Superconducting joint structural body
110 One or more of Nb alloy strips
110a One or more of cores
110b Sheet
110c Pipe
120 Joint strip
130 $Nb_3Sn$ superconducting wire
140 NbTi wire
150 One or more of $Nb_3Sn$ superconducting cores
160 One or more of NbTi cores
170 $Nb_3Sn$ superconducting layer
180 Crimp tube
210 First stabilizer
310 Second stabilizer
320, 530 Diffusion barrier layer
330 Third stabilizer
500a, 500b $Nb_3Sn$ superconducting precursor wire
510 One or more of Nb cores
520a Cu—Sn matrix
520b Cu matrix
540 Stabilizer
550 Sn matrix

The invention claimed is:

1. A superconducting joint structural body comprising:
a joint strip having one or more of Nb alloy strips to which an element M is added (wherein the element M is an element that increases a recovery temperature and a recrystallization temperature of Nb);
a $Nb_3Sn$ superconducting wire having one or more of $Nb_3Sn$ superconducting cores; and
a NbTi wire having one or more of NbTi cores, wherein
one end of the joint strip is jointed with the $Nb_3Sn$ superconducting wire by contact with each of the one or more of Nb alloy strips and each of the one or more of $Nb_3Sn$ superconducting cores through a $Nb_3Sn$ superconducting layer, and
the other end of the joint strip is jointed with the NbTi wire by mutual contact with each bare surface of the one or more of Nb alloy strips and each bare surface of the one or more of NbTi cores.

2. The superconducting joint structural body according to claim 1, wherein the element M is at least one selected from the group consisting of hafnium (Hf), titanium (Ti), tantalum (Ta), zirconium (Zr), and tungsten (W).

3. The superconducting joint structural body according to claim 1, wherein the one or more of Nb alloy strips have any one shape selected from the group consisting of a core, a sheet, and a pipe.

4. The superconducting joint structural body according to claim 1, wherein the element M is added in a range from 0.2 at % or more to 10 at % or less.

5. The superconducting joint structural body according to claim 4, wherein each of a portion where each of the one or more of Nb alloy strips and each of the one or more of $Nb_3Sn$ superconducting cores are in contact with each other through a $Nb_3Sn$ superconducting layer and a portion where each bare surface of the one or more of Nb alloy strips and each bare surface of the one or more of NbTi cores are in mutual contact is covered by means of a crimp tube made of at least one material selected from the group consisting of tantalum (Ta), niobium (Nb), copper-nickel alloy (CuNi), and stainless steel.

6. The superconducting joint structural body according to claim 5, wherein each of the covered portions has a length in a range from 10 mm or more to 30 mm or less.

7. The superconducting joint structural body according to claim 1, wherein
the joint strip has the one or more of Nb alloy strips each of which is covered with and/or embedded in a first stabilizer,
the $Nb_3Sn$ superconducting wire has the one or more of $Nb_3Sn$ superconducting cores each of which is covered with and/or embedded in a second stabilizer,
the NbTi wire has the one or more of NbTi cores each of which is covered with and/or embedded in a third stabilizer, and
each of the first to third stabilizers is at least one metal selected from the group consisting of copper metal, copper alloy, silver metal, and silver alloy.

8. A method for manufacturing the superconducting joint structural body according to claim 1, the method comprising the steps of:
a first jointing step for jointing one end of a joint strip having one or more of Nb alloy strips to which an element M is added (wherein the element M is an element that increases a recovery temperature and a recrystallization temperature of Nb) and a $Nb_3Sn$ superconducting wire having one or more of $Nb_3Sn$ superconducting cores; and
a second jointing step for jointing the other end of the joint strip and a NbTi wire having one or more of NbTi cores,
the first jointing step comprising the steps of:
a step of exposing the one or more of Nb alloy strips from one end of the joint strip;
a step of exposing the one or more of Nb cores from one end of a $Nb_3Sn$ superconducting precursor wire having one or more of Nb cores each of which is embedded in a matrix that contains at least Cu and Sn;
a step of bundling the exposed one or more of Nb alloy strips and the exposed one or more of Nb cores together;
a step of crimping the one or more of Nb alloy strips and the one or more of Nb cores that are bundled together; and
a step of annealing the joint strip having the one or more of Nb alloy strips and the one or more of Nb cores that are crimped together and the $Nb_3Sn$ superconducting precursor wire, and the second jointing step comprising the steps of:
a step of exposing the one or more of Nb alloy strips from the other end of the joint strip;
a step of exposing the one or more of NbTi cores from one end of the NbTi wire;
a step of bundling the exposed one or more of Nb alloy strips and the exposed one or more of NbTi cores together; and
a step of crimping the one or more of Nb alloy strips and the one or more of NbTi cores that are bundled together.

9. The method according to claim 8, wherein the step of exposing the one or more of Nb alloy strips in the first jointing step and the step of exposing the one or more of Nb alloy strips in the second jointing step are performed by means of chemical corrosion.

10. The method according to claim 8, wherein the step of exposing the one or more of Nb cores in the first jointing step is performed by means of chemical corrosion.

11. The method according to claim 10, wherein the step of exposing the one or more of Nb cores in the first jointing step is further performed by means of mechanical polishing.

12. The method according to claim 8, wherein the step of exposing the one or more of NbTi cores in the second jointing step is performed by means of chemical corrosion.

13. The method according to claim 8, wherein each of the following steps: the step of exposing the one or more of Nb alloy strips in the first jointing step and the step of exposing the one or more of Nb alloy strips in the second jointing step; the step of exposing the one or more of Nb cores in the first jointing step; and the step of exposing the one or more of NbTi cores in the second jointing step is performed so that any exposed length is in a range from 10 mm or more and 30 mm or less.

14. The method according to claim 8, wherein the crimping step in the first jointing step is performed by exposing each bare surface of the one or more of Nb alloy strips and each bare surface of the one or more of Nb cores, and by being the each bare surface of the one or more of Nb alloy strips and the each bare surface of the one or more of Nb cores in close contact with each other.

15. The method according to claim 14, wherein the crimping step in the first jointing step is performed by covering a portion bundling the one or more of Nb alloy strips and the one or more of Nb cores by means of a crimp tube made of at least one material selected from the group consisting of tantalum (Ta), niobium (Nb), copper-nickel alloy (CuNi), and stainless steel, and applying a pressure in a perpendicular direction to a longitudinal direction of the one or more of Nb alloy strips and the one or more of Nb cores that are bundled together.

16. The method according to claim 15, wherein the pressure is in a range from 100 MPa or more to 1 GPa or less.

17. The method according to claim 8, wherein the annealing step in the first jointing step is performed by means of an annealing treatment of the joint strip and the $Nb_3Sn$ superconducting precursor wire, in vacuum or in an inert gas atmosphere, within a temperature range from 600° C. or more to 800° C. or less.

18. The method according to claim 17, wherein the annealing step in the first jointing step is performed by means of an annealing treatment of the joint strip and the $Nb_3Sn$ superconducting precursor wire, in vacuum or in an inert gas atmosphere, within a temperature range from 300° C. or more to 500° C. or less for 50 hours or more to 150 hours or less, and then within a temperature range from 600° C. or more to 800° C. or less for 50 hours or more to 150 hours or less.

19. The method according to claim 8, wherein the crimping step in the second jointing step is performed by exposing each bare surface of the one or more of Nb alloy strips and the one or more of NbTi cores, and by being the each bare surface of the one or more of Nb alloy strips and the each bare surface of the one or more of NbTi cores in close contact with each other.

20. The method according to claim 19, wherein the crimping step in the second jointing step is performed by covering a portion bundling the one or more of Nb alloy strips and the one or more of NbTi cores by means of a crimp tube made of a material selected from the group consisting of tantalum (Ta), niobium (Nb), copper-nickel alloy (CuNi), and stainless steel, and applying a pressure in a perpendicular direction to a longitudinal direction of the one or more of Nb alloy strips and the one or more of NbTi cores that are bundled together.

21. The method according to claim 20, wherein the pressure is in a range from 100 MPa or more and 1 GPa or less.

22. A nuclear magnetic resonance apparatus comprising the superconducting joint structural body according to claim 1.

* * * * *